(12) United States Patent
Takizawa

(10) Patent No.: US 9,746,489 B2
(45) Date of Patent: Aug. 29, 2017

(54) PHYSICAL QUANTITY SENSOR WITH MULTIPLE MASSES AND DISPLACEMENT CONVERSION MECHANISM

(71) Applicant: Seiko Epson Corporation, Tokyo (JP)

(72) Inventor: Teruo Takizawa, Matsumoto (JP)

(73) Assignee: Seiko Epson Corporation (JP)

( * ) Notice: Subject to any disclaimer, the term of this patent is extended or adjusted under 35 U.S.C. 154(b) by 361 days.

(21) Appl. No.: 14/551,649

(22) Filed: Nov. 24, 2014

(65) Prior Publication Data
US 2015/0143904 A1 May 28, 2015

(30) Foreign Application Priority Data

Nov. 25, 2013 (JP) .................... 2013-242633

(51) Int. Cl.
*G01P 15/097* (2006.01)
*G01C 19/5733* (2012.01)

(52) U.S. Cl.
CPC ........ *G01P 15/097* (2013.01); *G01C 19/5733* (2013.01)

(58) Field of Classification Search
CPC ...... G01P 15/097; G01P 9/04; G01C 19/5733
USPC .............. 73/504.12, 505, 510, 517
See application file for complete search history.

(56) References Cited

U.S. PATENT DOCUMENTS

| | | | | | |
|---|---|---|---|---|---|
| 5,359,893 A | * | 11/1994 | Dunn | .................. | G01C 19/5719 73/504.12 |
| 5,895,850 A | * | 4/1999 | Buestgens | ............ | G01C 19/574 73/504.02 |
| 5,945,599 A | * | 8/1999 | Fujiyoshi | ........... | G01C 19/5719 73/504.12 |
| 6,393,913 B1 | * | 5/2002 | Dyck | .................. | G01P 15/0802 333/186 |
| 6,467,349 B1 | | 10/2002 | Andersson et al. | | |
| 6,487,864 B1 | * | 12/2002 | Platt | ........................ | F25B 21/02 62/3.2 |
| 6,843,127 B1 | * | 1/2005 | Chiou | ................ | G01C 19/5719 73/504.12 |
| 6,907,782 B2 | | 6/2005 | Lentner et al. | | |
| 6,990,864 B2 | * | 1/2006 | Sakai | .................... | G01P 15/125 73/504.04 |

(Continued)

FOREIGN PATENT DOCUMENTS

| | | |
|---|---|---|
| EP | 2339293 A1 | 6/2011 |
| JP | 2002-501202 A | 1/2002 |

(Continued)

*Primary Examiner* — Lisa Caputo
*Assistant Examiner* — Nathaniel T Woodward
(74) *Attorney, Agent, or Firm* — Harness, Dickey & Pierce, P.L.C.

(57) ABSTRACT

A functional element includes a driving portion, a first mass portion which is vibrated along the first direction, a first connection portion which is connected to the first mass portion and can perform a first movement in which the first connection portion contracts and extends along the first direction, a second connection portion which is connected to the first connection portion, extends in a second direction intersecting the first direction, and can perform a second movement in which the second connection portion rotates with the second direction as the axis, and a second mass portion which is connected to the second connection portion.

18 Claims, 16 Drawing Sheets

(56) References Cited

U.S. PATENT DOCUMENTS

| | | | |
|---|---|---|---|
| 7,287,428 B2* | 10/2007 | Green | G01C 19/574 73/504.12 |
| 7,377,167 B2* | 5/2008 | Acar | G01C 19/5719 73/504.12 |
| 7,434,464 B2* | 10/2008 | Li | G01C 19/5719 73/504.04 |
| 7,461,552 B2* | 12/2008 | Acar | G01P 15/125 73/504.04 |
| 7,617,728 B2* | 11/2009 | Cardarelli | G01C 19/5719 73/504.16 |
| 7,694,563 B2* | 4/2010 | Durante | G01C 19/5712 73/504.04 |
| 8,047,075 B2* | 11/2011 | Nasiri | G01P 15/125 73/510 |
| 8,113,050 B2* | 2/2012 | Acar | G01C 19/574 73/504.04 |
| 8,146,424 B2* | 4/2012 | Johnson | G01C 19/5719 73/504.12 |
| 8,261,614 B2* | 9/2012 | Hartmann | G01C 19/5712 73/504.12 |
| 8,616,057 B1* | 12/2013 | Mao | G01C 19/574 73/504.12 |
| 8,739,627 B2 | 6/2014 | Li et al. | |
| 2009/0158847 A1* | 6/2009 | Fujiyoshi | G01C 19/5719 73/504.12 |
| 2010/0045137 A1* | 2/2010 | Yoda | B81B 3/004 310/300 |
| 2011/0154898 A1* | 6/2011 | Cazzaniga | G01C 19/5747 73/504.12 |
| 2011/0157898 A1 | 6/2011 | Kanai | |
| 2012/0215355 A1* | 8/2012 | Bewley | B25J 5/005 700/258 |
| 2013/0068018 A1* | 3/2013 | Seeger | G01C 19/5712 73/504.12 |
| 2015/0300821 A1* | 10/2015 | Takizawa | G01C 19/574 73/504.12 |

FOREIGN PATENT DOCUMENTS

| | | |
|---|---|---|
| JP | 2004-514894 A | 5/2004 |
| JP | 2013-092525 A | 5/2013 |
| WO | WO-99-38016 A1 | 7/1999 |
| WO | WO-02-44652 A1 | 6/2002 |

* cited by examiner

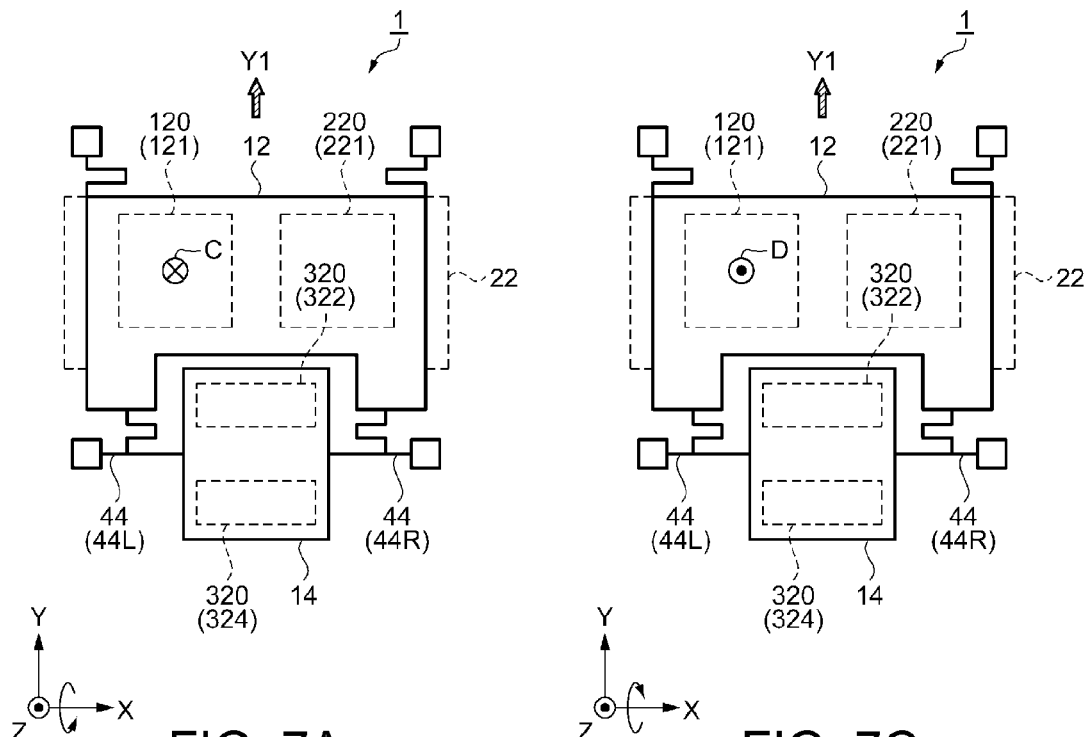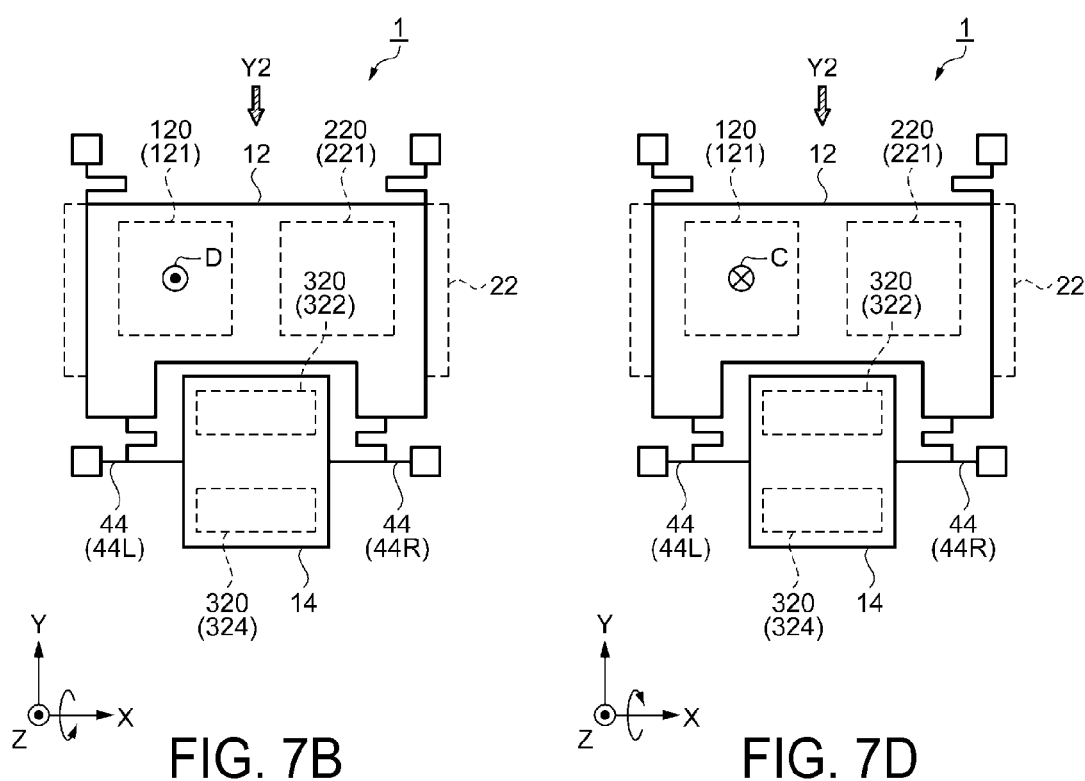

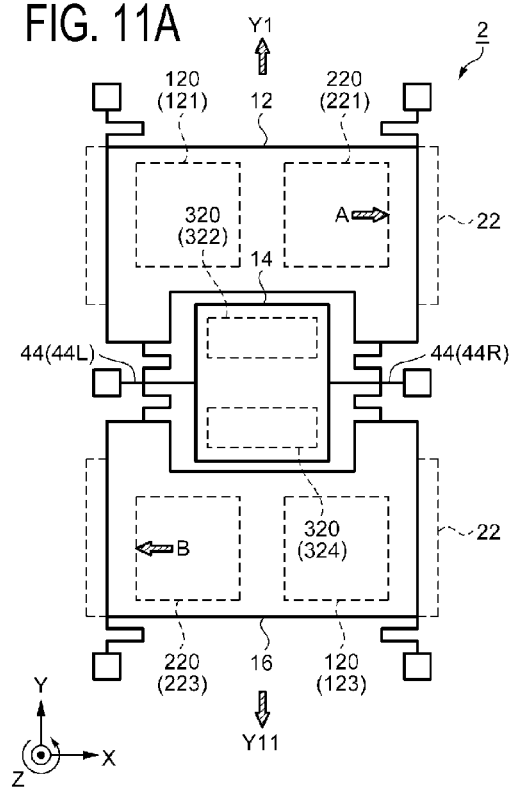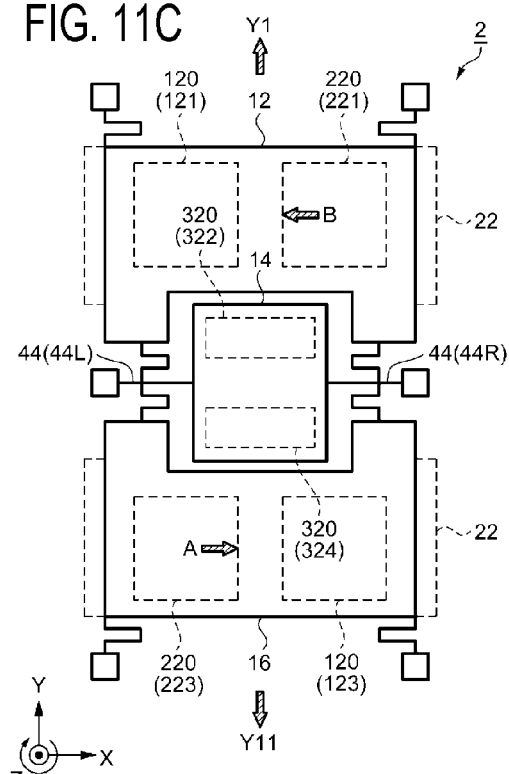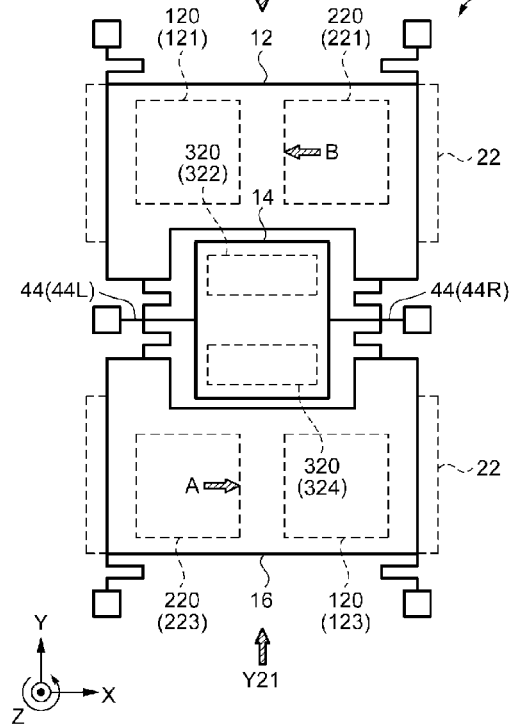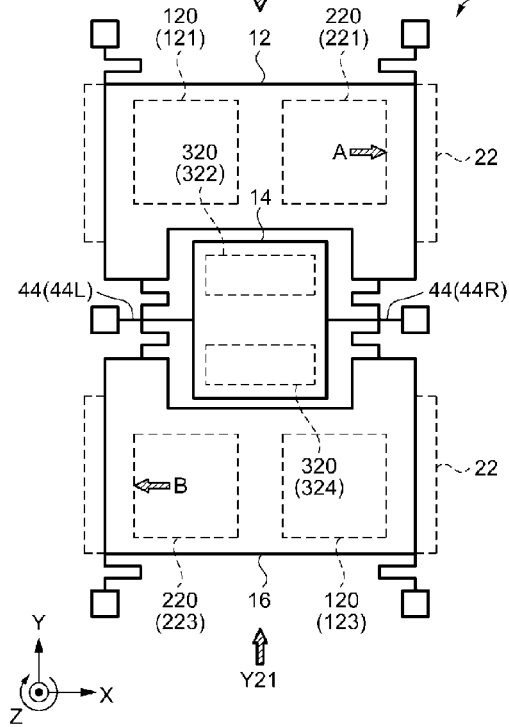

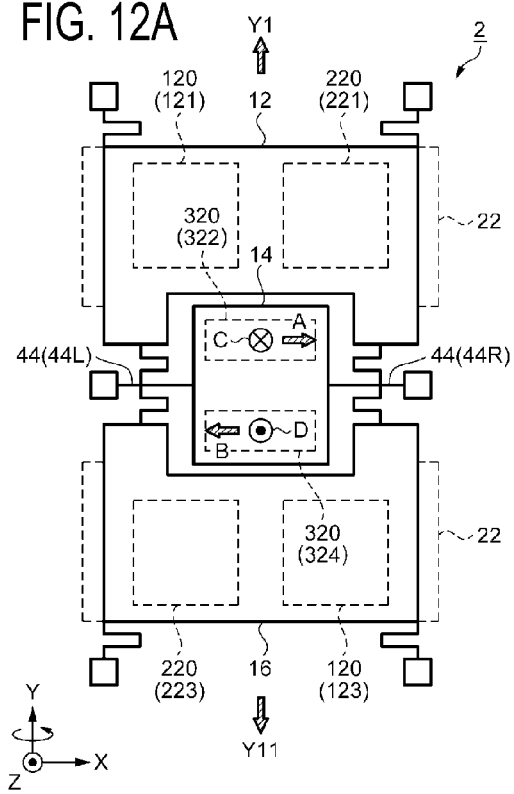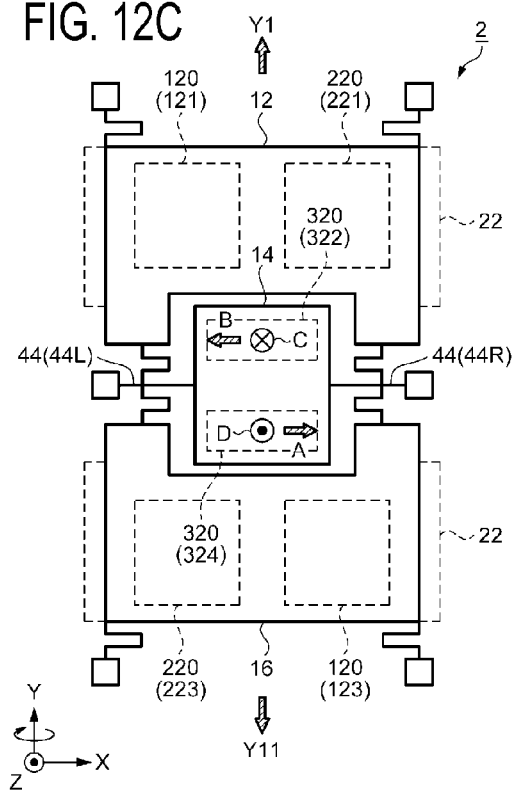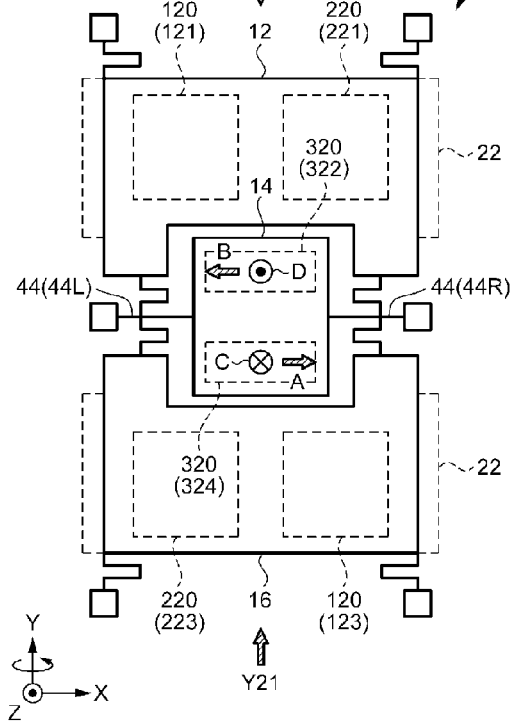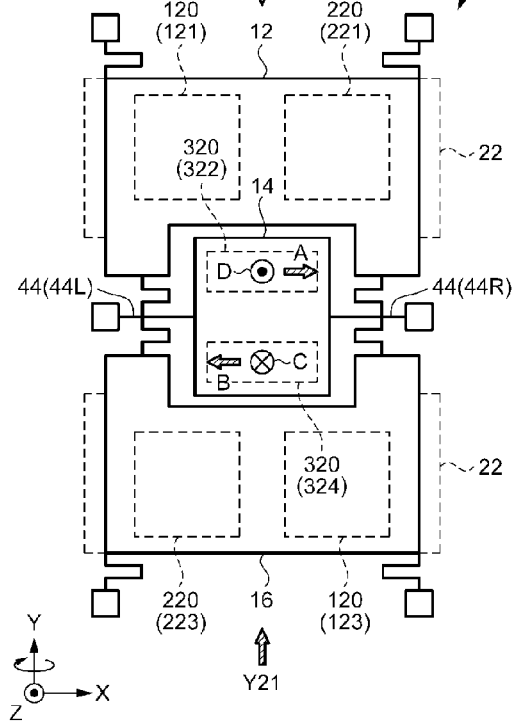

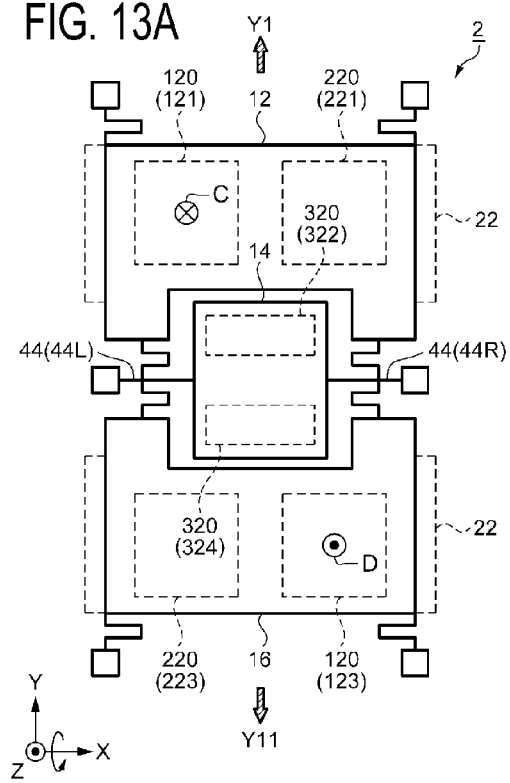
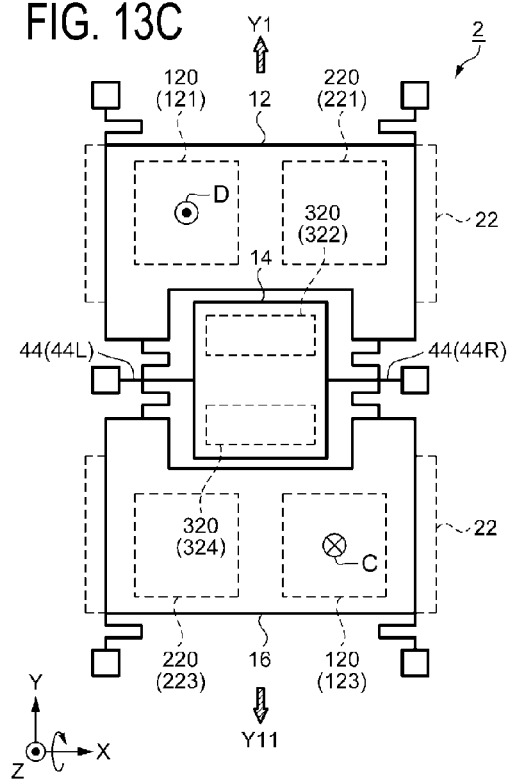
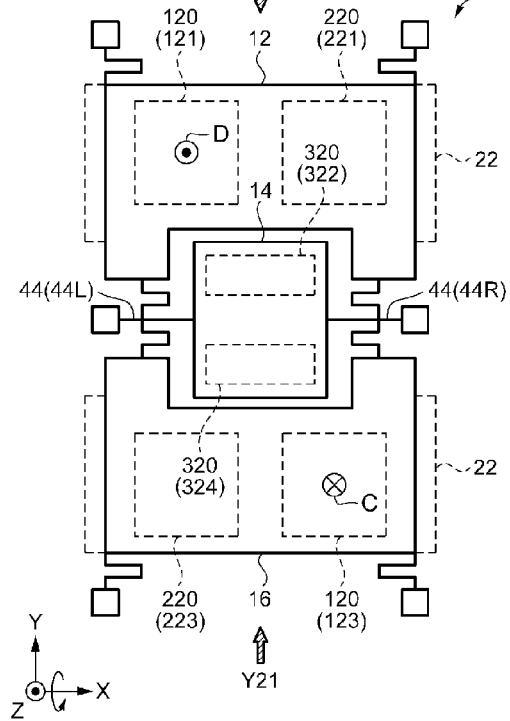
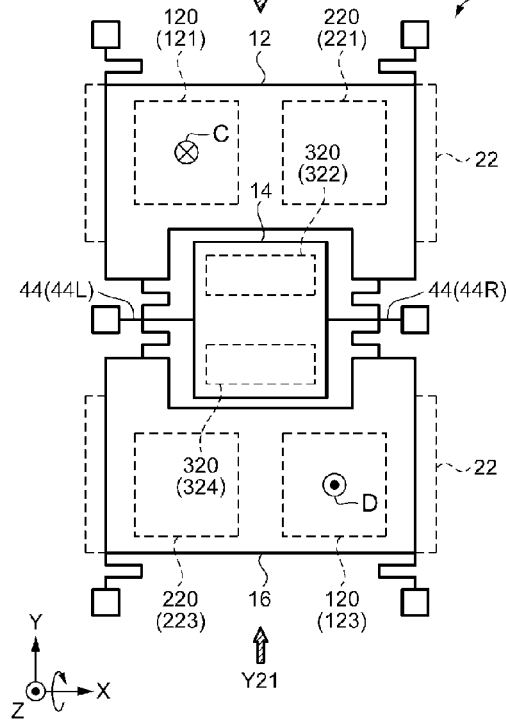

PHYSICAL QUANTITY SENSOR WITH MULTIPLE MASSES AND DISPLACEMENT CONVERSION MECHANISM

CROSS-REFERENCE TO RELATED APPLICATIONS

This application claims priority to Japanese Patent Application No. 2013-242633 filed on Nov. 25, 2013. The entire disclosure of Japanese Patent Application No. 2013-242633 is hereby incorporated herein by reference.

BACKGROUND

1. Technical Field

The present invention relates to a functional element and an electronic device and a moving object on which the functional element is mounted.

2. Related Art

As a functional element which detects a physical quantity such as an angular velocity or acceleration in the related art, a functional element is known, which moves a mass portion on which the element for detecting the physical quantity is provided and detects the physical quantity applied to the functional element. In the functional element, a reduction in size or high detection accuracy of the functional element is required according to a reduction in size or high accuracy of the electronic device on which the functional element is mounted.

For example, in US2011/0154898A, as a functional element capable of detecting physical quantities of three axes orthogonal to one another, a structure is disclosed in which at least four mass portions are horizontally disposed on an in-plane and each mass portion is connected by a connection portion. In the functional element, by moving two mass portions, the other two mass portions are moved via the connection portion, and thus, the physical quantity is detected.

However, in the above-described functional element, the movement of the mass portion is mainly performed in the in-plan direction in which the mass portions are disposed, and thus, there is a problem that a horizontal area of the functional element is increased by the mass portions which are horizontally disposed on the in-plane. Accordingly, there is a concern that a reduction of the size of an electronic device on which the functional element is mounted may be damaged.

SUMMARY

An advantage of some aspects of the invention is to solve at least a part of the problems described above, and the invention can be implemented as the following forms or application examples.

APPLICATION EXAMPLE 1

This application example is directed to a functional element including: a driving portion; a first mass portion which is vibrated along a first direction; a first connection portion which is connected to the first mass portion and can perform a first movement in which the first connection portion extends and contracts along the first direction; a second connection portion which is connected to the first connection portion and extends in a second direction intersecting the first direction, and can perform a second movement in which the second connection portion rotates with the second direction as the axis; and a second mass portion which is connected to the second connection portion.

According to the functional element, the first connection portion connected to the first mass portion vibrated along the first direction and the second connection portion extended in the second direction intersecting the first direction are connected to each other. Accordingly, the first movement along the first direction is applied to the vibrated first mass portion, and can be transmitted to the second connection portion via the first connection portion extendable and contractible in the first direction.

Therefore, a force associated with the first movement of the first mass portion can be transmitted, and thus, in the second connection portion, the second movement rotated with the second direction, in which the second connection portion extends, as the axis can be performed. Moreover, the second mass portion connected to the second connection portion can be rotated with the second direction, in which the second connection portion extends, as the axis.

Accordingly, a functional element can be realized in which disposition areas of the first mass portion and the second mass portion are suppressed, and directions of vibration speed components applied to the first mass portion and the second mass portion are different from each other. In addition, since the disposition areas of the first mass portion and the second mass portion are suppressed, a functional element in which a reduction in size can be achieved can be realized.

APPLICATION EXAMPLE 2

In the functional element according to the application example, it is preferable that the functional element includes a force conversion portion which can convert the first movement of the first connection portion and the second movement of the second connection portion into each other in a connection region between the first connection portion and the second connection portion.

According to the functional element of the configuration described above, the first movement of the first connection portion is converted into the movement in a direction different from the first direction, and can be transmitted to the second connection portion. In addition, the movement in the direction different from the direction in which the second connection portion moves can be transmitted to the first connection portion.

APPLICATION EXAMPLE 3

In the functional element according to the application example, it is preferable that the first connection portion is asymmetrically connected with respect to an axial center of rotation of the second connection portion.

According to the functional element of the configuration described above, the first connection portion is asymmetrically (a position deviated from the axial center) connected to the axial center about which the second connection portion rotates. Accordingly, displacement in the first direction by the vibration of the first mass portion is transmitted to the second connection portion by the first connection portion, and a twisting force can be applied to the second connection portion which extends in the second direction. Accordingly, the second mass portion connected to the second connection portion can rotate with the second direction, in which the second connection portion extends, as the axis, and thus, the vibration speed component in the direction different from the direction of the vibration speed component applied to the first mass portion can be applied.

APPLICATION EXAMPLE 4

In the functional element according to the application example, it is preferable that the second mass portion includes a detection portion which detects a Coriolis force by at least one of a rotational movement with the first direction as the axis and a rotational movement with the second direction as the axis.

According to the functional element of the configuration described above, the detection portion, which detects the Coriolis force by at least one of the rotational movements with the first direction or the second direction as the axis with respect to the vibration speed component applied to the second mass portion, is provided on the second mass portion. Accordingly, it is possible to detect the rotational movements, which are applied to the functional element, with the first direction or the second direction as the axis.

APPLICATION EXAMPLE 5

In the functional element according to the application example, it is preferable that the first mass portion includes a detection portion which detects the Coriolis force by a rotational movement about the axis orthogonal to the first direction.

According to the functional element of the configuration described above, the detection portion, which detects the Coriolis force by the rotational movement with the direction orthogonal to the first direction as the axis with respect to the vibration speed component applied to the first mass portion, is provided on the first mass portion. Accordingly, it is possible to detect the rotational movement with the direction orthogonal to the first direction applied to the functional element as the axis.

APPLICATION EXAMPLE 6

In the functional element according to the application example, it is preferable that the first connection portion is connected to a third mass portion opposite to the first mass portion.

According to the functional element of the configuration described above, in the first connection portion which is connected to the first mass portion and is extendable and contractible in the first direction, the other end opposite to one end connected to the first mass portion is connected to the third mass portion. Accordingly, the first connection portion extends and contracts in the first direction according to the vibration of the first mass portion, and the third mass portion can be vibrated in a reverse phase with respect to the first mass portion. Accordingly, the vibration speed component having a reverse phase with respect to the first mass portion can be applied to the third mass portion.

APPLICATION EXAMPLE 7

In the functional element according to the application example, it is preferable that the third mass portion includes a detection portion which detects the Coriolis force by a rotational movement about an axis orthogonal to the first direction.

According to the functional element of the configuration described above, the detection portion, which detects the Coriolis force by the rotational movement with the direction orthogonal to the first direction as the axis with respect to the vibration speed component applied to the third mass portion, is provided on the third mass portion. The vibration speed components having reverse phases are applied to the first mass portion and the third mass portion. Accordingly, the Coriolis forces generated in the first mass portion and the third mass portion are generated in reverse phases. Accordingly, the rotational movement, which is applied to the functional element, with the direction orthogonal to the first direction as the axis can be differentially detected, and thus, a functional element having high detection accuracy can be realized.

APPLICATION EXAMPLE 8

This application example is directed to an electronic device on which the functional element described above is mounted.

According to the electronic device, since the functional element, in which the mass portions having vibration speed components having different directions are provided, the areas on which the mass portions are disposed are suppressed, and high detection accuracy is obtained is mounted on the electronic device, an electronic device which can measure the dropping and inclination and has high reliability and realizes a reduction in size can obtained.

APPLICATION EXAMPLE 9

This application example is directed to a moving object on which the functional element described above is mounted.

According to the moving object, since the functional element, in which the mass portions having vibration speed components having different directions are provided, the areas on which the mass portions are disposed are suppressed, and high detection accuracy is obtained is mounted on the moving object, a moving object which can measure the dropping and inclination and has high reliability can obtained.

BRIEF DESCRIPTION OF THE DRAWINGS

The invention will be described with reference to the accompanying drawings, wherein like numbers reference like elements.

FIGS. 7A to 7D are views explaining the operation of the functional element and are plan views showing a state where a rotational movement around an X axis is applied to the functional element.

FIGS. 11A to 11D are views explaining the operation of the functional element and are plan views showing a state where a rotational movement around a Z axis is applied to the functional element.

FIGS. 12A to 12D are views explaining the operation of the functional element and are plan views showing a state where a rotational movement around a Y axis is applied to the functional element.

FIGS. 13A to 13D are views explaining the operation of the functional element and are plan views showing a state where a rotational movement around an X axis is applied to the functional element.

DESCRIPTION OF EXEMPLARY EMBODIMENTS

Figure 1:
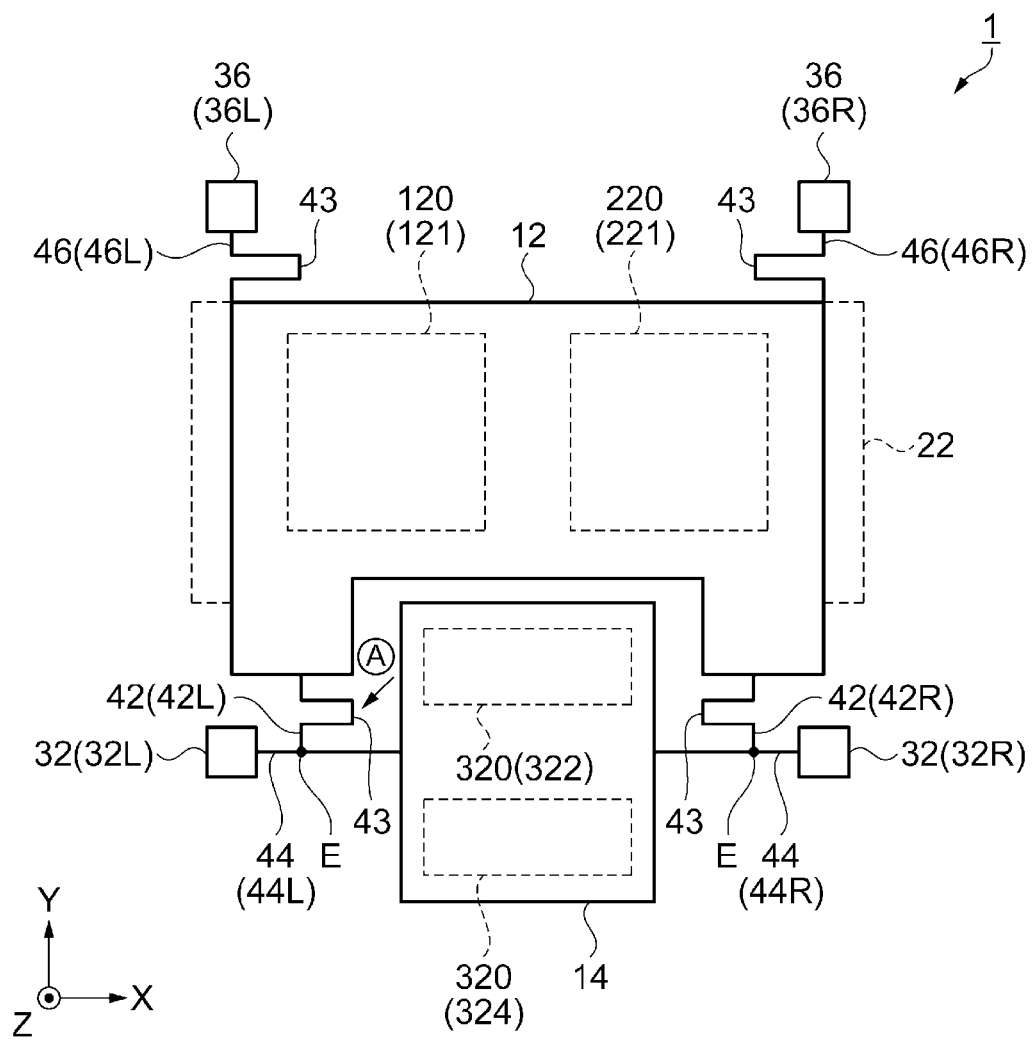
FIG. 1 is a plan view schematically showing a functional element according to a first embodiment.

Hereinafter, embodiments of the invention will be described with reference to the drawings. Moreover, in each drawing described below, in order to make a size of each component in the drawings be recognizable, the size and the ratio of each component may be described to be appropriately different from those of an actual component.

First Embodiment

A functional element 1 according to a first embodiment will be described with reference to FIGS. 1 to 7D.

Figure 2A:
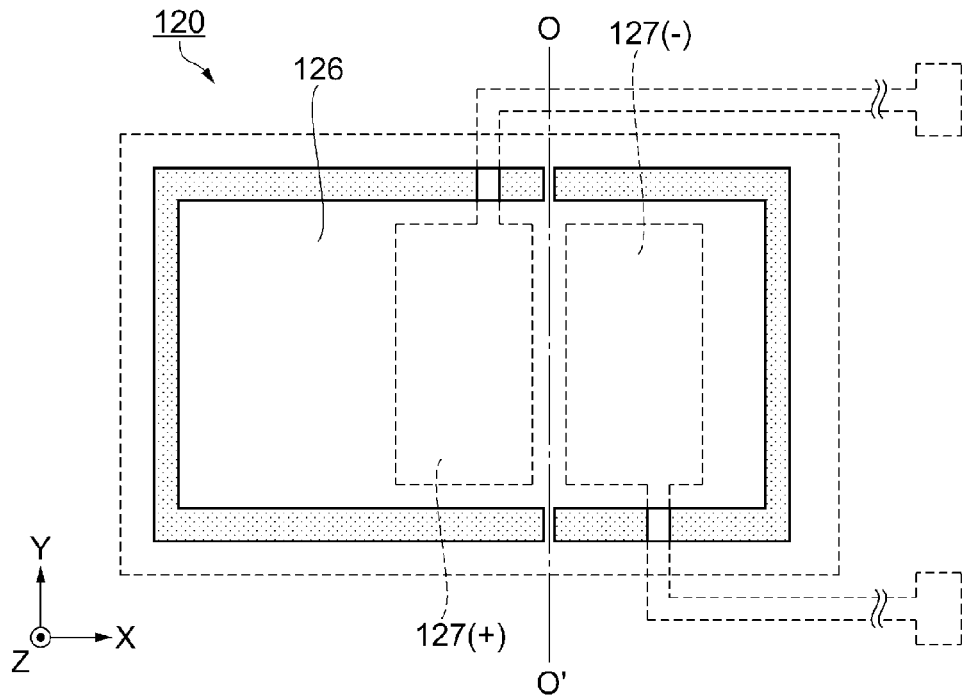
FIGS. 2A and 2B are plan views schematically showing a detection portion which is provided on the functional element.
Figure 2B:
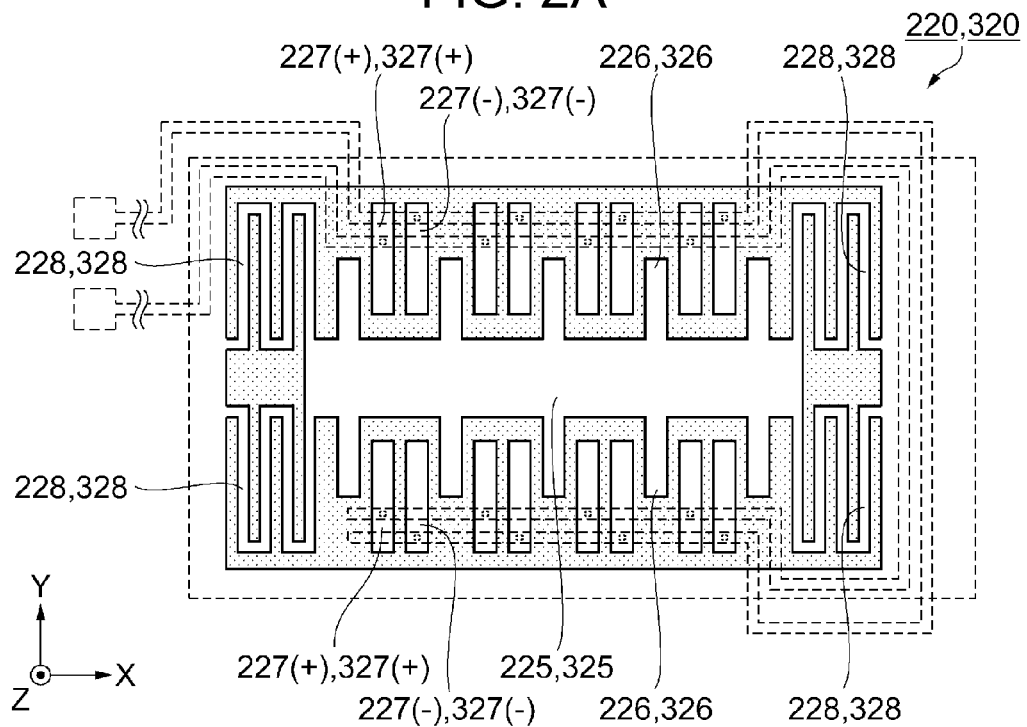
Figure 3A:
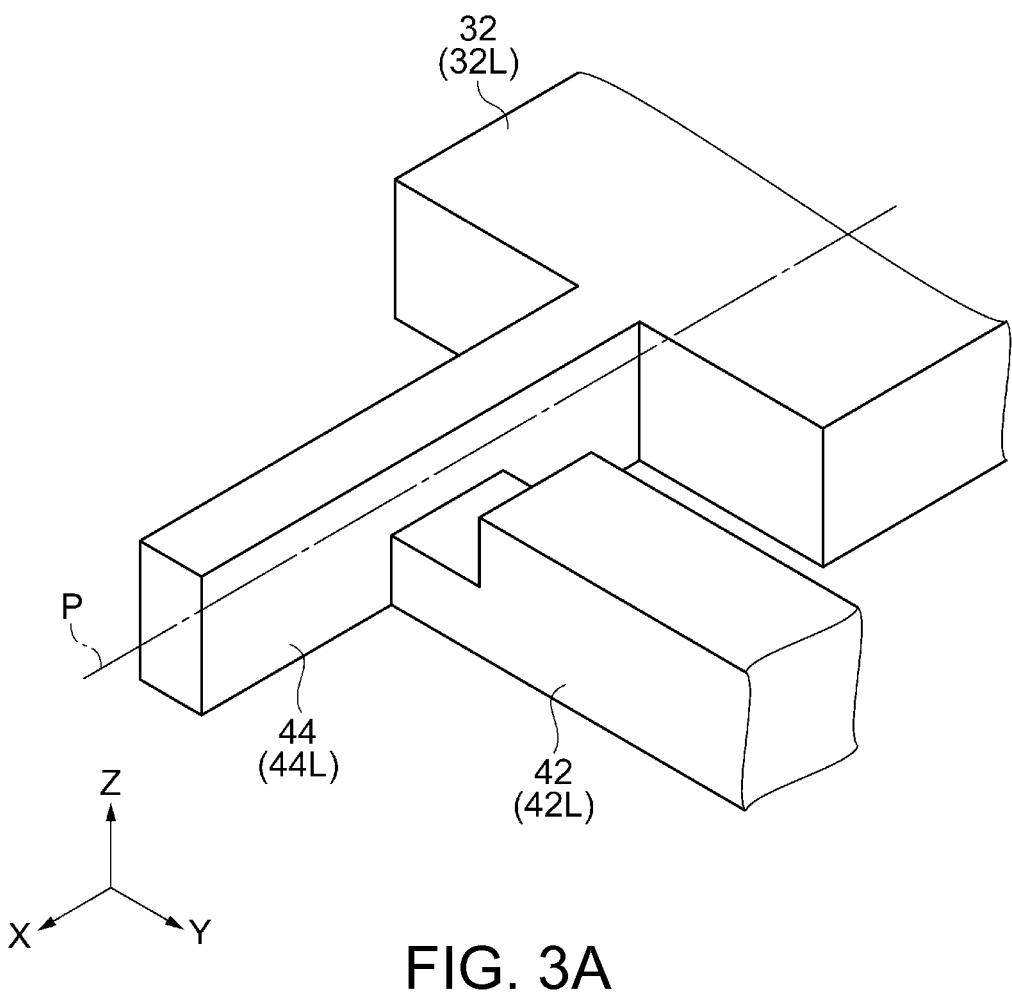
FIGS. 3A and 3B are enlarged views schematically showing a portion at which a first connection portion and a second connection portion provided on the functional element are connected to each other.
Figure 3B:
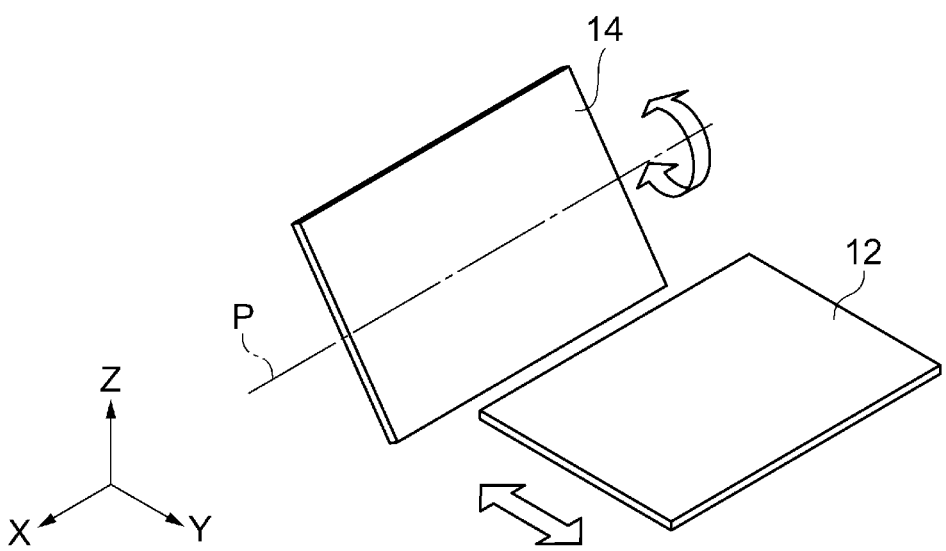

FIG. 1 is a plan view schematically showing the functional element according to the embodiment. FIGS. 2A and 2B are plan views schematically showing a first detection portion and a second detection portion which are provided on the functional element. FIGS. 3A and 3B are enlarged views (perspective views) schematically showing a portion at which a first connection portion and a second connection portion provided on the functional element are connected to each other.

Figure 4A:
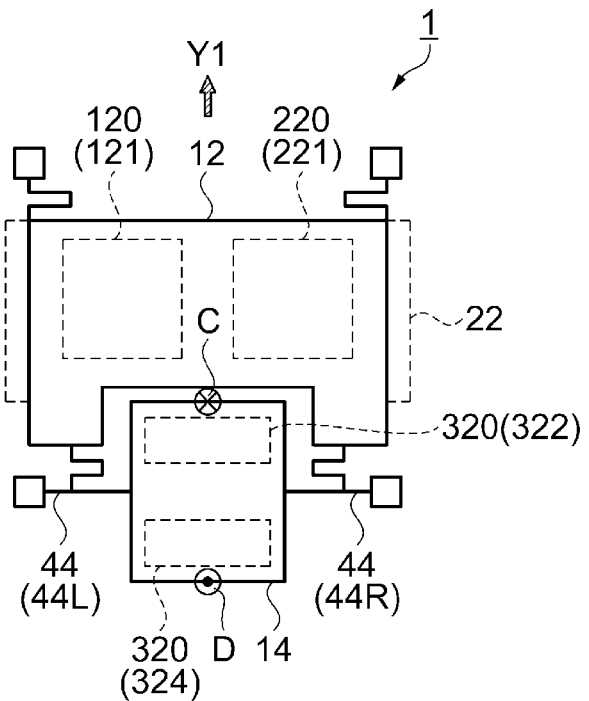
FIGS. 4A and 4B are views explaining an operation of the functional element and are plan views showing an initial state where a rotational movement is not applied to the functional element.

FIGS. 4A to 7D are views explaining an operation of the functional element according to the embodiment. FIGS. 4A and 4B are plan views showing an initial state where a rotational movement is not applied to the functional element. FIGS. 5A to 5D are plan views showing a state where a rotational movement around a Z axis is applied to the functional element. FIGS. 6A to 6D are plan views showing a state where a rotational movement around a Y axis is applied to the functional element. FIGS. 7A to 7D are plan views showing a state where a rotational movement around an X axis is applied to the functional element.

Moreover, in FIGS. 1 to 7D, three axes different from one another such as the X axis, the Y axis, and the Z axis orthogonal to one another are defined as necessary, and the embodiment will be described using the axes.

Structure of Functional Element 1

The functional element 1 of the embodiment includes a first mass portion 12, a second mass portion 14, a driving portion 22, a first connection portion 42, a second connection portion 44, a third connection portion 46, a first fixing portion 32, and a second fixing portion 36. In the functional element 1, the first mass portion 12 and the second mass portion 14 are connected to each other via the first connection portion 42 and the second connection portion 44. Moreover, according to vibration of the driving portion 22, a vibration speed component which is a movement along a first direction can be applied to the first mass portion 12, and a vibration speed component in a direction different from the first direction can be applied to the second mass portion 14 via the first connection portion 42 and the second connection portion 44.

Hereinafter, the structure of the functional element 1 will be described in detail.

First Mass Portion 12

The first mass portion 12 is a weight which can be displaced by the vibration of the driving portion 22.

A first detection portion 120 and a second detection portion 220 are provided on the first mass portion 12.

Moreover, the first connection portion 42 and the third connection portion 46 are connected to the first mass portion 12.

The first connection portion 42 is soft in the Y axis direction defined in FIG. 1 and is hard in other directions. That is, the first connection portion is elastically deformed along the Y axis, and thus, the first mass portion 12 can be easily displaced in the Y axis direction. The third connection portion 46 also is soft in the Y axis direction and is hard in other directions. Accordingly, similar to the first connection portion 42, the third connection portion 46 is elastically deformed along the Y axis, and thus, the first mass portion 12 can be easily displaced in the Y axis direction. In general, in order to cause an elastic spring to be soft in the Y axis direction and hard in other directions, at least one or more bending portions 43 are provided on the elastic spring. According to the operation of the bending portion, the first mass portion 12 can be vibrated in the Y axis direction by the vibration of the driving portion 22.

The first detection portion 120 is provided as a sensor element which detects an angular velocity around the X axis which is defined in FIG. 1. In the first detection portion 120, the detection method is not particularly limited, and various types such as an electrostatic capacitance type or a piezoelectric capacitance type can be used.

An example of the first detection portion 120 of the embodiment is shown in FIG. 2A. As the first detection portion 120, a so-called "flap type capacitance" sensor element can be used, which includes a movable electrode 126 journaled by an axis O-O' and a fixed electrode 127 which is disposed to face the movable electrode 126.

In the sensor element, the movable electrode 126 is displaced according to a rotational moment which is generated around the axis O-O' according to the angular velocity, and thus, a gap between the movable electrode 126 and the fixed electrode 127 is changed. Accordingly, a gap between both electrodes is changed, and thus, capacitance generated between both electrodes is changed. The fixed electrode 127 is divided into two electrodes (fixed electrode 127 (+) and fixed electrode 127 (−)) having different potentials while interposing the axis O-O', and a desired angular velocity can be effectively detected by differentially detecting the different potentials.

The second detection portion 220 is provided as a sensor element which detects an angular velocity around the Z axis which is defined in FIG. 1. In the second detection portion 220, the detection method is not particularly limited, and various types such as an electrostatic capacitance type or a piezoelectric capacitance type can be used.

An example of the second detection portion 220 of the embodiment is shown in FIG. 2B. As the second detection portion 220, a so-called "interdigital capacitance" sensor element can be used, which includes a movable mass portion 225 suspended to a flexible elastic spring 228 in the X axis direction, a movable electrode 226 provided on the movable mass portion 225, and a fixed electrode 227 disposed to configure comb teeth.

In the sensor element, the movable mass portion 225 is displaced in the X axis direction according to the angular velocity, and thus, a gap between the movable electrode 226 and the fixed electrode 227 is changed. The fixed electrode 227 is divided into two electrodes (fixed electrode 227 (+) and fixed electrode 227 (−)) having different potentials, and a desired angular velocity can be effectively detected by differentially detecting the different potentials.

Second Mass Portion 14

Return to FIG. 1, the second mass portion 14 will be described.

The second mass portion 14 is a mass (weight) which can be displaced according to the displacement of the first mass portion 12 by the vibration speed component. A third detection portion 320 is provided on the second mass portion 14. Moreover, the second connection portion 44 is connected to the second mass portion 14. The other end of the second connection portion 44 is fixed to the first fixing portion 32, and the second connection portion 44 acts as a torsion spring. That is, the second mass portion 14 can be rotated with the second connection portion 44 as the axis.

In the third detection portion 320 provided on the second mass portion 14, a third detection portion 322 and a third detection portion 324 are provided in the Y axis direction (+Y axis direction and −Y axis direction) intersecting the X axis about the X axis along which the second connection portion 44 extends.

The third detection portion 322 is disposed on the second mass portion 14 of the direction (+Y axis direction) side in which the first mass portion 12 is provided from the X axis along which the second connection portion 44 extends.

The third detection portion 324 is disposed on the second mass portion 14 of a direction (−Y axis direction) side opposite to the direction in which the first mass portion 12 is provided from the X axis along which the second connection portion 44 extends.

In addition, in descriptions below, when the third detection portions 322 and 324 are collectively referred to be included, it is referred to as the "third detection portion 320".

The third detection portion 320 is provided as a sensor element which detects an angular velocity around the Y axis which is defined in FIG. 1. In the third detection portion 320, the detection method is not particularly limited, and various types such as an electrostatic capacitance type or a piezoelectric capacitance type can be used.

An example of the third detection portion 320 of the embodiment is shown in FIG. 2B. Similar to the above-described second detection portion 220, as the third detection portion 320, a so-called "interdigital capacitance" sensor element can be used, which includes a movable mass portion 325 suspended to a flexible elastic spring 328 in the X axis direction, a movable electrode 326 provided on the movable mass portion 325, and a fixed electrode 327 disposed to configure comb teeth.

In the sensor element, the movable mass portion 325 is displaced in the X axis direction according to the angular velocity, and thus, a gap between the movable electrode 326 and the fixed electrode 327 is changed. Accordingly, capacitance generated between both electrodes is changed. The fixed electrode 327 is divided into two electrodes (fixed electrode 327 (+) and fixed electrode 327 (−)) having different potentials, and a desired angular velocity can be effectively detected by differentially detecting the different potentials.

First Connection Portion 42

Return to FIG. 1, the first connection portion 42 will be described.

The first connection portion 42 extends toward the Y axis direction from the first mass portion 12.

The bending portion 43 meandering in the X axis direction intersecting the Y axis direction in which the first connection portion 42 extends is provided on the first connection portion 42. The bending portion 43 is provided between the first mass portion 12 and the second connection portion 44. Since the first connection portion 42 includes the bending portion 43, the spring constant of the first connection portion in the Y axis direction can be decreased (the first connection portion can be soft).

Moreover, the first connection portion 42 includes a connection region at the region in which the first connection portion 42 and the second connection portion 44 intersect each other. The connection region is provided at least between the second mass portion 14 and the first fixing portion 32. Moreover, a second connection portion 44L and a first connection portion 42L described below are connected to each other at the connection region, and thus, form a displacement conversion mechanism. In addition, a second connection portion 44R and a first connection portion 42R described below are connected to each other at the connection region, and thus, form a displacement conversion mechanism E. Moreover, in descriptions below, when the first connection portions 42L and 42R are collectively referred to be included, it is referred to as the "first connection portion 42".

Second Connection Portion 44 and First Fixing Portion 32

The second connection portion 44 extends toward the X axis direction from the second mass portion 14. More specifically, the second connection portion 44 extends in both directions along the X axis about the second mass portion 14. The other end of the second connection portion 44, which is different from the one end connected to the second mass portion 14, is connected to the first fixing portion 32. The second connection portion 44 has a degree of freedom in a torsional direction, and can rotate the second mass portion 14. Accordingly, the rotational movement of the second mass portion 14 can be performed.

The second connection portion 44 includes a second connection portion 44R which extends in the +X axis direction from the second mass portion 14, and a second connection portion 44L which extends in the −X axis direction, which is the direction opposite to the extension direction of the second connection portion 44R, from the second mass portion 14.

The other end of the second connection portion 44R, which is different from the one end connected to the second mass portion 14, is connected to the first fixing portion 32R. The other end of the second connection portion 44L, which is different from the one end connected to the second mass portion 14, is connected to the first fixing portion 32L. Moreover, in descriptions below, when the second connection portions 44L and 44R are collectively referred to be included, it is referred to as the "second connection portion 44".

The above-described connection region will be described in detail. FIG. 3A is an enlarged view which is shown from the perspective of point A in FIG. 1. The above-described first connection portion 42 is connected to the second connection portion 44. The first connection portion 42 is connected to the second connection portion 44 between the first fixing portion 32 and the second mass portion 14. Here, as shown in FIGS. 3A and 3B, the first connection portion 42 and the second connection portion 44 are connected to each other at a position deviated from an axial center P (a virtual line indicated by a reference numeral P in FIGS. 3A and 3B) of the second connection portion 44. Accordingly, when the first mass portion 12 linearly moves, a force, which is applied to the first connection portion 42 according to the linear displacement, is transmitted to the second connection portion 44. At this time, since a point of application of the force is deviated from the axial center P, the linear movement of the first connection portion 42 is converted into the rotational moment of the second connection portion 44. Accordingly, the second connection portion 44 can rotate with the axial center P as the rotational axis. On the contrary, when the second mass portion 14 is rotated, a torsional force which is applied to the first connection portion 42 according to the displacement of the rotation is transmitted to the first connection portion 42. At this time, the rotational moment of the second connection portion 44 is converted into the linear movement of the first connection portion 42.

A relationship between the linear movement and the rotational movement described above is shown in FIG. 3B. The first mass portion 12 linearly moves in the Y axis direction, and the second mass portion 14 rotates about the axial center P. By the displacement conversion mechanism E which is provided on the connection region, the linear movement of the first mass portion 12 and the rotational movement of the second mass portion 14 can be in complementarily conjunction with each other.

Third Connection Portion 46 and Second Fixing Portion 36

Return to FIG. 1, the third connection portion 46 and the second fixing portion 36 will be described.

The third connection portion 46 extends toward the +Y axis direction from the first mass portion 12.

The other end of the third connection portion 46, which is different from the one end connected to the first mass portion 12, is connected to the second fixing portion 36. Similar to the first connection portion 42, the bending portion 43 meandering in the X axis direction intersecting the Y axis direction in which the third connection portion 46 extends is provided on the third connection portion 46. The bending portion 43 is provided between the first mass portion 12 and the second fixing portion 36. Since the third connection portion 46 includes the bending portion 43, the third connection portion 46 can be extended and contracted in the Y axis direction.

Moreover, the third connection portion 46 includes a third connection portion 46L connected to the second fixing portion 36L and a third connection portion 46R connected to the second fixing portion 35R. Moreover, in descriptions below, when the third connection portions 46R and 46L are collectively referred to be included, it is referred to as the "third connection portion 46". In addition, when the second fixing portions 36R and 36L are collectively referred to be included, it is referred to as the "second fixing portion 36".

Driving Portion 22

The driving portion 22 vibrates the first mass portion 12, and is provided to apply a vibration speed component in the Y axis direction, which is a first direction, to the first mass portion 12.

The method in which the driving portion 22 vibrates the first mass portion 12 is not particularly limited, and various piezoelectric drive elements or electrostatic drive elements can be used. As an example, the driving portion 22 of the embodiment uses the electrostatic drive element. Since the electrostatic drive element is used, by electrostatic induction generated between an electrode (not shown) provided on the driving portion 22 and an electrode (not shown) provided on the first mass portion 12, the first mass portion 12 is vibrated, and the vibration speed component in the Y axis direction can be applied to the first mass portion.

Moreover, secondarily, the driving portion 22 may vibrate the second mass portion 14 in the direction of the rotational movement which is a second direction. The vibration method is not particularly limited, and various piezoelectric drive elements or various electrostatic drive elements may be used. Specifically, an electrode (not shown) for electrostatic driving is provided below the second mass portion 14, and thus, the second mass portion may be vibrated by the electrostatic induction.

Operation of Functional Element 1

An operation of the functional element 1 will be described with reference to FIGS. 4A to 7D.

The vibration speed component associated with the linear movement along the Y axis direction is applied to the first mass portion 12 by the vibration of the driving portion 22.

When the first mass portion 12 is displaced in the +Y axis direction (a direction of an arrow Y1 in FIG. 4A) by the vibration speed component, the second mass portion 14 is rotated with the X axis, to which the second connection portion 44 extends, as the rotational axis. In the second mass portion 14, the side on which the third detection portion 322 is provided is rotated in the −Z axis direction (the rear side of the paper surface which is a direction of an arrow C in FIG. 4A), and on the other hand, the side on which the third detection portion 324 is provided is rotated in the +Z axis direction (the front side of the paper surface which is a direction of an arrow D in FIG. 4A).

Moreover, in the following descriptions with respect to the operation of the functional element 1, this displacement is referred to as "first vibration speed displacement" by the vibration.

When the first mass portion 12 is displaced in the −Y axis direction (a direction of an arrow Y2 in FIG. 4B) by the vibration speed component, the second mass portion 14 is rotated with the X axis, to which the second connection portion 44 extends, as the rotational axis. In the second mass portion 14, the side on which the third detection portion 322 is provided is rotated in the +Z axis direction (the front side of the paper surface which is the direction of the arrow D in FIG. 4B), and on the other hand, the side on which the third detection portion 324 is provided is rotated in the −Z axis direction (the rear side of the paper surface which is the direction of the arrow C in FIG. 4B). Moreover, in the following descriptions with respect to the operation of the functional element 1, this displacement is referred to as "second vibration speed displacement" by the vibration.

In addition, when the first vibration speed displacement and the second vibration speed displacement are collectively referred to be included, it is referred to as "vibration speed displacement", and a direction in which the displacement is generated is referred to as a "vibration speed displacement direction".

Figure 4B:
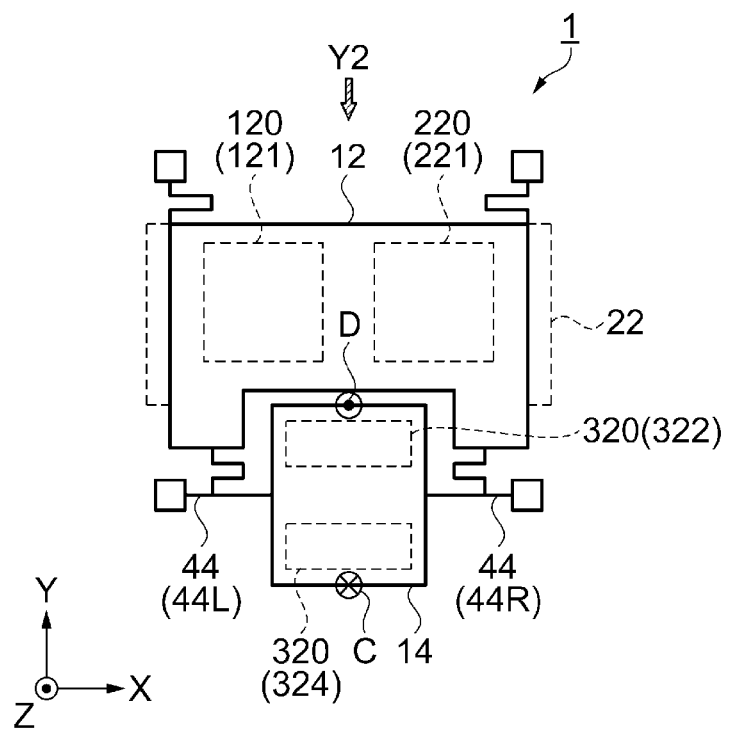

In the functional element 1, as shown in FIGS. 4A and 4B, when the rotational movement or the like is not applied to the functional element 1, in all the first detection portion 120, the second detection portion 220, and the third detection portion 320, the displacement in the gaps between the fixed electrodes 127, 227, and 327 and the movable electrodes 126, 226, and 326 is not generated.

Moreover, in the functional element 1, the vibration speed component in the direction different from the direction of the vibration speed component applied to the first mass portion 12 can be applied to the second mass portion 14.

Operation When Rotation Movement with Z Axis as the Rotational Axis is Applied

As shown in FIGS. 5A to 5D, in the functional element 1, when the rotational movement with the Z axis as the rotational axis is applied, among the first detection portion 120, the second detection portion 220, and the third detection portion 320, the displacement is generated in the gap between the fixed electrode 227 and the movable electrode 226 included in the second detection portion 220 (the illustration is omitted in FIGS. 5A to 5D, and thus, refer to FIGS. 2A and 2B). Specifically, if the rotational movement with the Z axis as the rotational axis is applied when the vibration speed displacement is generated in the first mass portion 12, a Coriolis displacement is generated in the direction (X axis direction) orthogonal to the vibration speed displacement direction (Y axis direction).

Figure 5A:
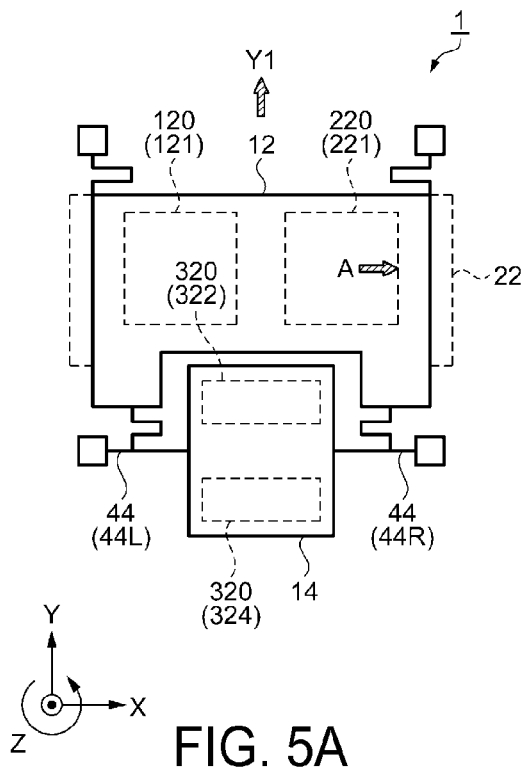
FIGS. 5A to 5D are views explaining the operation of the functional element and are plan views showing a state where a rotational movement around a Z axis is applied to the functional element.
Figure 5C:
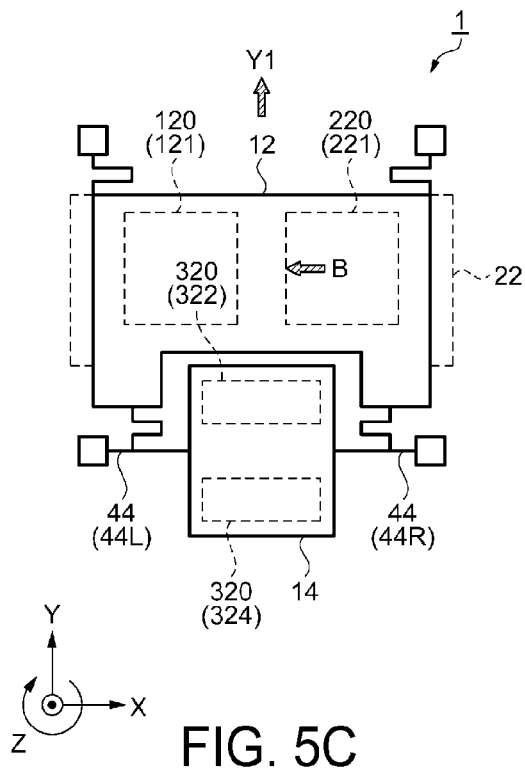
Figure 5B:
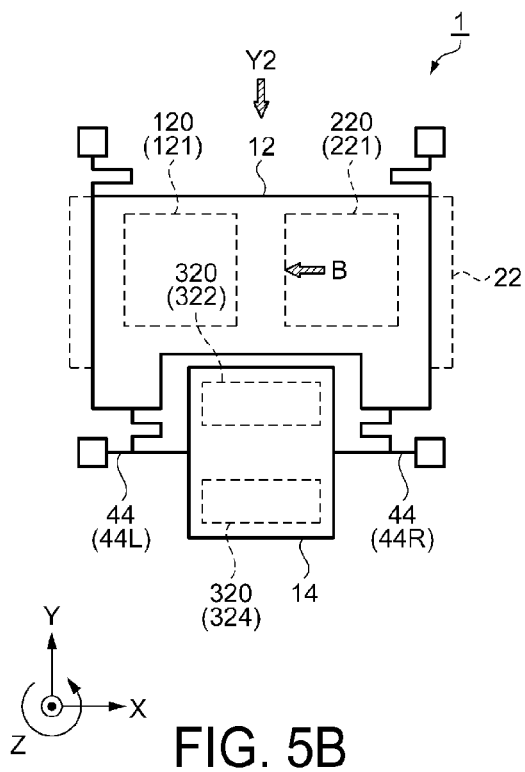

When the vibration speed displacement is generated in the first mass portion 12 as shown in FIGS. 5A and 5B, if a counterclockwise rotational movement with the Z axis as the rotational axis is applied, a force by the Coriolis displacement is generated in the second detection portion 221.

According to the force by the Coriolis displacement, the movable electrode 226 (movable mass portion 225) included in the second detection portion 221 is displaced in the X axis direction. In the second detection portion 221, since the movable electrode 226 is displaced in the X axis direction, the gap between the fixed electrode 227 and the movable electrode 226 is changed, and thus, the rotational movement can be detected.

As shown in FIG. 5A, when the first vibration speed displacement is generated in the first mass portion 12, the movable electrode 226 included in the second detection portion 221 is displaced in the +X axis direction (a direction of an arrow A in FIG. 5A).

As shown FIG. 5B, when the second vibration speed displacement is generated in the first mass portion 12, the movable electrode 226 included in the second detection portion 221 is displaced in the −X axis direction (a direction of an arrow B in FIG. 5B).

By this displacement, the counterclockwise rotational movement with the Z axis as the rotational axis can be detected.

Figure 5D:
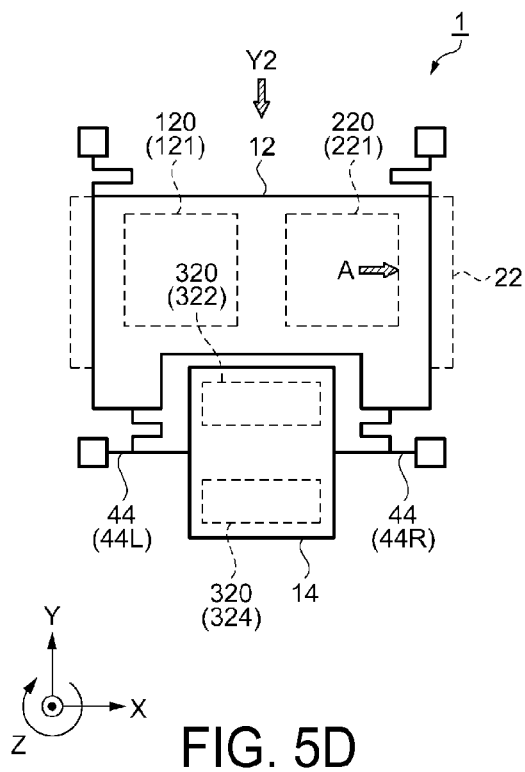

When the vibration speed displacement is generated in the first mass portion 12 as shown in FIGS. 5C and 5D, if a clockwise rotational movement with the Z axis as the rotational axis is applied, a force by the Coriolis displacement is generated in the second detection portion 221. According to the force by the Coriolis displacement, the movable electrode 226 (movable mass portion 225) included in the second detection portion 221 is displaced in the X axis direction. In the second detection portion 221, since the movable electrode 226 is displaced in the X axis direction, the gap between the fixed electrode 227 and the movable electrode 226 is changed, and thus, the rotational movement can be detected.

As shown in FIG. 5C, when the first vibration speed displacement is generated in the first mass portion 12, the movable electrode 226 included in the second detection portion 221 is displaced in the −X axis direction (the direction of the arrow B in FIG. 5C).

As shown FIG. 5D, when the second vibration speed displacement is generated in the first mass portion 12, the movable electrode 226 included in the second detection portion 221 is displaced in the +X axis direction (the direction of the arrow A in FIG. 5D).

By this displacement, the clockwise rotational movement with the Z axis as the rotational axis can be detected.

Operation When Rotation Movement with Y Axis as the Rotational Axis is Applied

As shown in FIGS. 6A to 6D, in the functional element 1, when the rotational movement with the Y axis as the rotational axis is applied, among the first detection portion 120, the second detection portion 220, and the third detection portion 320, the displacement is generated in the gap between the fixed electrode 327 and the movable electrode 326 included in the third detection portion 320 (the illustration is omitted in FIGS. 6A to 6D, and thus, refer to FIGS. 2A and 2B). Specifically, if the rotational movement with the Y axis as the rotational axis is applied when the vibration speed displacement is generated in the second mass portion 14, the Coriolis displacement is generated in the direction (X axis direction) orthogonal to the vibration speed displacement direction (Y axis direction).

Figure 6A:
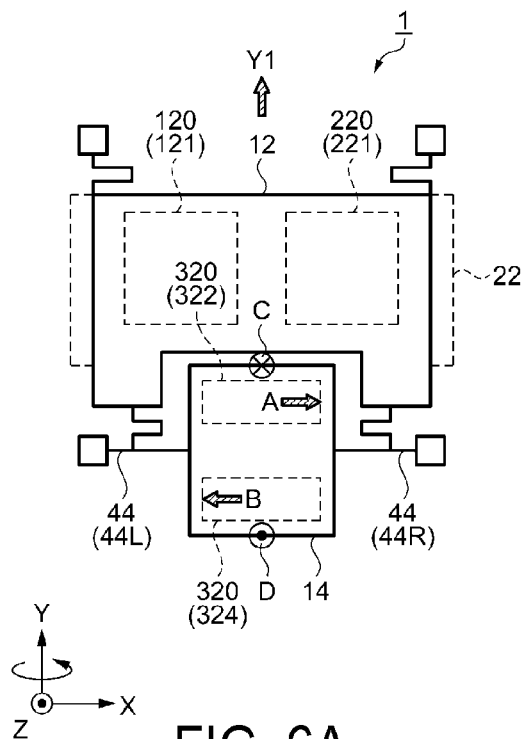
FIGS. 6A to 6D are views explaining the operation of the functional element and are plan views showing a state where a rotational movement around a Y axis is applied to the functional element.
Figure 6C:
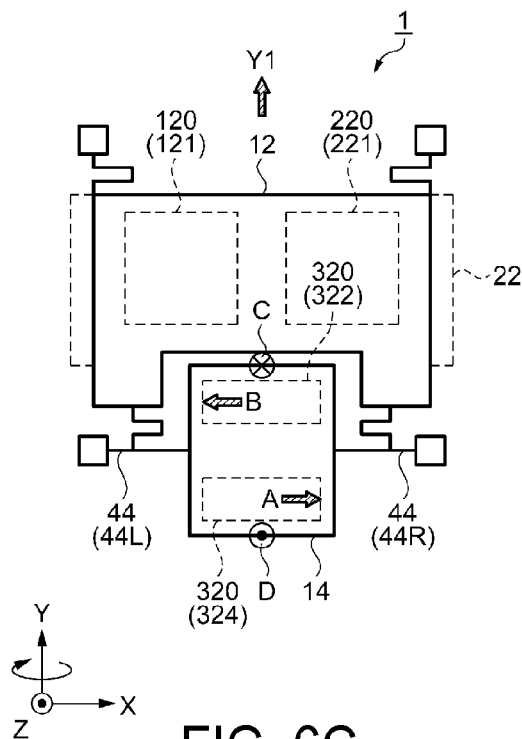
Figure 6B:
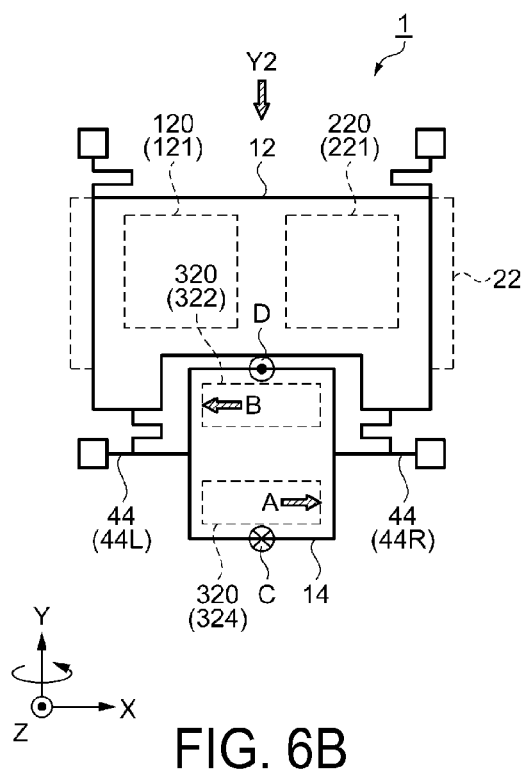

When the vibration speed displacement is generated in the second mass portion 14 as shown in FIGS. 6A and 6B, if a counterclockwise rotational movement with the Y axis as the rotational axis is applied, the force by the Coriolis displacement is generated in the third detection portion 320.

According to the force by the Coriolis displacement, the movable electrode 326 (movable mass portion 325) included in the third detection portion 320 is displaced in the X axis direction. In the third detection portion 320, since the movable electrode 326 is displaced in the X axis direction, the gap between the fixed electrode 327 and the movable electrode 326 is changed, and thus, the rotational movement can be detected.

As shown in FIG. 6A, when the first vibration speed displacement is generated in the second mass portion 14, the movable electrode 326 included in the third detection portion 322 is displaced in the +X axis direction (a direction of an arrow A in FIG. 6A). In addition, the movable electrode included in the third detection portion 324 is displaced in the −X axis direction (the direction of the arrow B in FIG. 6A).

As shown FIG. 6B, when the second vibration speed displacement is generated in the second mass portion 14, the movable electrode 326 included in the third detection portion 322 is displaced in the −X axis direction (the direction of the arrow B in FIG. 6B). Moreover, the movable electrode included in the third detection portion 324 is displaced in the +X axis direction (the direction of the arrow A in FIG. 6B).

Here, the direction (Z axis direction) of the vibration speed displacement applied to the second mass portion 14, on which the third detection portion 322 and the third detection portion 324 are provided, is a reverse phase (reverse direction) to each other, and thus, the force by the Coriolis displacement is also generated in the reverse direction.

By this displacement, the counterclockwise rotational movement with the Y axis as the rotational axis can be detected.

Figure 6D:
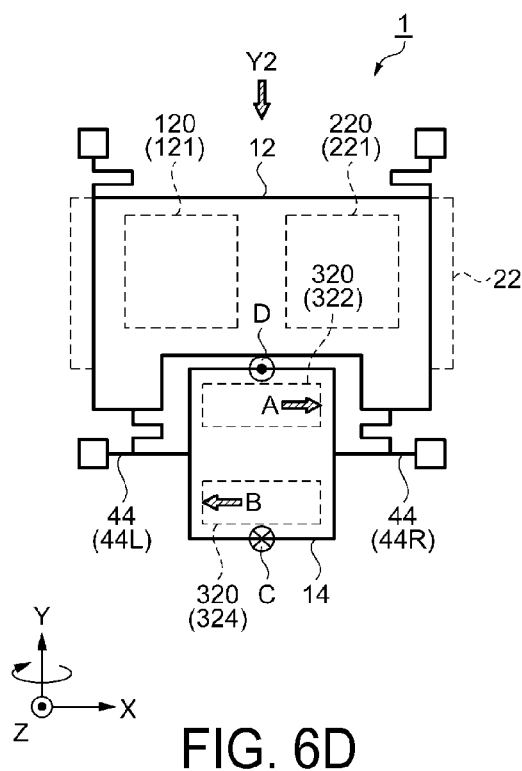

When the vibration speed displacement is generated in the second mass portion 14 as shown in FIGS. 6C and 6D, if a clockwise rotational movement with the Y axis as the rotational axis is applied, the force by the Coriolis displacement is generated in the third detection portion 320.

According to the force by the Coriolis displacement, the movable electrode 326 (movable mass portion 325) included in the third detection portion 320 is displaced in the X axis direction. In the third detection portion 320, since the movable electrode 326 is displaced in the X axis direction, the gap between the fixed electrode 327 and the movable electrode 326 is changed, and thus, the rotational movement can be detected.

As shown in FIG. 6C, when the first vibration speed displacement is generated in the second mass portion 14, the movable electrode 326 included in the third detection portion 322 is displaced in the −X axis direction (the direction of the arrow B in FIG. 6C). In addition, the movable electrode 326 included in the third detection portion 324 is displaced in the +X axis direction (the direction of the arrow A in FIG. 6C).

As shown FIG. 6D, when the second vibration speed displacement is generated in the second mass portion 14, the movable electrode 326 included in the third detection portion 322 is displaced in the +X axis direction (the direction of the arrow A in FIG. 6D). Moreover, the movable electrode 326 included in the third detection portion 324 is displaced in the −X axis direction (the direction of the arrow B in FIG. 6D).

Here, the direction (Z axis direction) of the vibration speed displacement applied to the second mass portion 14, on which the third detection portion 322 and the third detection portion 324 are provided, is a reverse direction to each other, and thus, the force by the Coriolis displacement is also generated in the reverse direction.

By this displacement, the clockwise rotational movement with the Y axis as the rotational axis can be detected.

Operation when Rotation Movement with X Axis as the Rotational Axis is Applied

As shown in FIGS. 7A to 7D, in the functional element 1, when the rotational movement with the X axis as the rotational axis is applied, among the first detection portion 120, the second detection portion 220, and the third detection portion 320, the displacement is generated in the gap between the fixed electrode 127 and the movable electrode 126 included in the first detection portion 120 (the illustration is omitted in FIGS. 7A to 7D, and thus, refer to FIGS. 2A and 2B). Specifically, if the rotational movement with the X axis as the rotational axis is applied when the vibration speed displacement is generated in the first mass portion 12, the Coriolis displacement is generated in the direction (Z axis direction) orthogonal to the vibration speed displacement direction (Y axis direction).

When the vibration speed displacement is generated in the first mass portion 12 as shown in FIGS. 7A and 7B, if a counterclockwise rotational movement with the Y axis as the rotational axis is applied, the force by the Coriolis displacement is generated in the first detection portion 120.

According to the force by the Coriolis displacement, the movable electrode 126 included in the first detection portion 120 is displaced in the Z axis direction. In the first detection portion 120, since the movable electrode 126 is displaced in the Z axis direction, the gap between the fixed electrode 127 and the movable electrode 126 is changed, and thus, the rotational movement can be detected.

As shown in FIG. 7A, when the first vibration speed displacement is generated in the first mass portion 12, the movable electrode 126 included in the first detection portion 120 is displaced in the −Z axis direction (the direction of the arrow C in FIG. 7A).

As shown FIG. 7B, when the second vibration speed displacement is generated in the first mass portion 12, the movable electrode included in the first detection portion 120 is displaced in the +Z axis direction (the direction of the arrow D in FIG. 7B).

By this displacement, the counterclockwise rotational movement with the X axis as the rotational axis can be detected.

When the vibration speed displacement is generated in the first mass portion 12 as shown in FIGS. 7C and 7D, if a clockwise rotational movement with the Y axis as the rotational axis is applied, a force by the Coriolis displacement is generated in the first detection portion 120.

According to the force by the Coriolis displacement, the movable electrode 126 included in the first detection portion 120 is displaced in the Z axis direction. In the first detection portion 120, since the movable electrode 126 is displaced in the Z axis direction, the gap between the fixed electrode 127 and the movable electrode 126 is changed, and thus, the rotational movement can be detected.

As shown in FIG. 7C, when the first vibration speed displacement is generated in the first mass portion 12, the movable electrode 126 included in the first detection portion 120 is displaced in the +Z axis direction (the direction of the arrow D in FIG. 7C).

As shown FIG. 7B, when the second vibration speed displacement is generated in the first mass portion 12, the movable electrode 126 included in the first detection portion 120 is displaced in the −Z axis direction (the direction of the arrow C in FIG. 7D).

By this displacement, the clockwise rotational movement with the X axis as the rotational axis can be detected.

According to the above-described first embodiment, the following effects can be obtained.

According to the functional element 1, the force associated with the vibration speed component which is obtained by the vibration of the first mass portion 12 is transmitted to the second connection portion 44 via the first connection portion 42, and thus, the vibration speed component in the direction different from the first mass portion 12 can be applied to the second mass portion 14 connected to the second connection portion 44. The Coriolis force orthogonal to the Y axis direction in which the vibration speed component applied to the first mass portion 12 is operated with respect to the rotational movement applied to the functional element 1 is generated in the first detection portion 120 and the second detection portion 220 provided in the first mass portion 12. The Coriolis force orthogonal to the Z axis direction in which the vibration speed component applied to the second mass portion 14 is operated with respect to the rotational movement applied to the functional element 1 is generated in the third detection portion 320 provided in the second mass portion 14.

Accordingly, the first detection portion 120 can detect the rotational movement with the X axis as the axis, the second detection portion 220 can detect the rotational movement with the Z axis as the axis, and the third detection portion 320 can detect the rotational movement with the Y axis as the axis. Therefore, the functional element 1 can be realized, which can detect the rotational movements in the three axes in which the directions in the vibration speed components applied to the first mass portion 12 and the second mass portion 14 are different from one another while suppressing the disposition areas of the first mass portion 12 and the second mass portion 14. Moreover, since the disposition areas of the first mass portion 12 and the second mass portion 14 are suppressed, the functional element 1 capable of achieving a reduction in size and detecting the rotational movements of three axes can be realized.

Second Embodiment

A functional element 2 according to a second embodiment will be described with reference to FIGS. 8 to 13D.

Figure 8:
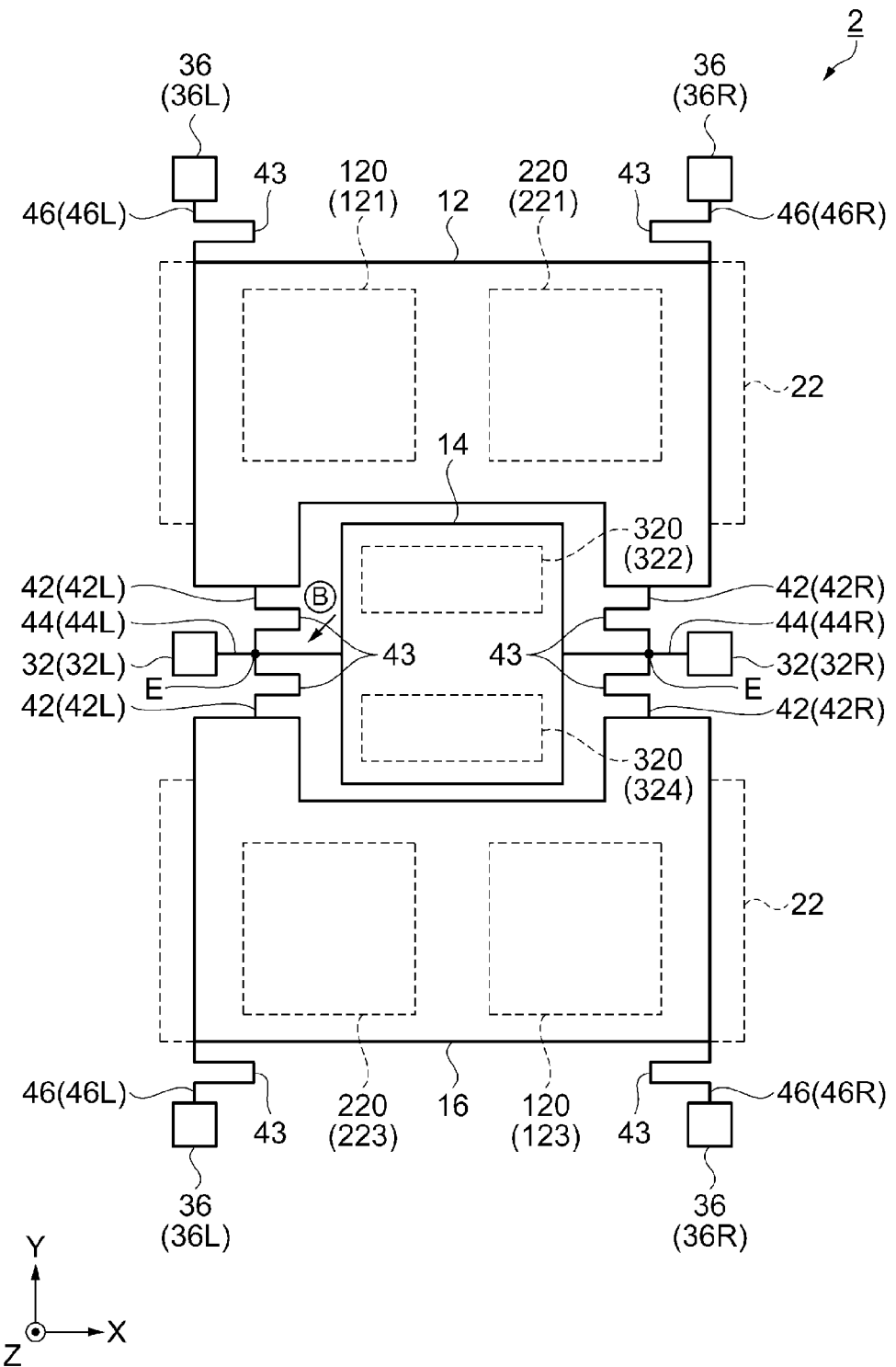
FIG. 8 is a plan view schematically showing a functional element according to a second embodiment.
Figure 9A:
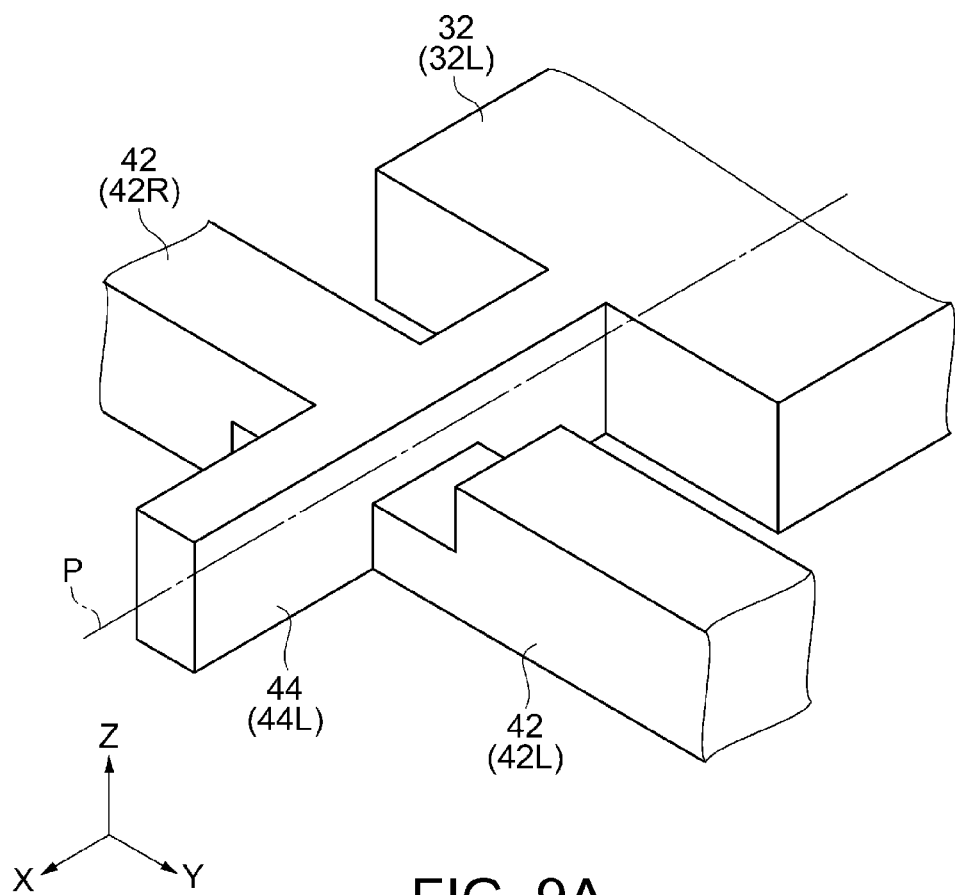
FIGS. 9A and 9B are enlarged views schematically showing a portion at which a first connection portion and a second connection portion provided on the functional element are connected to each other.
Figure 9B:
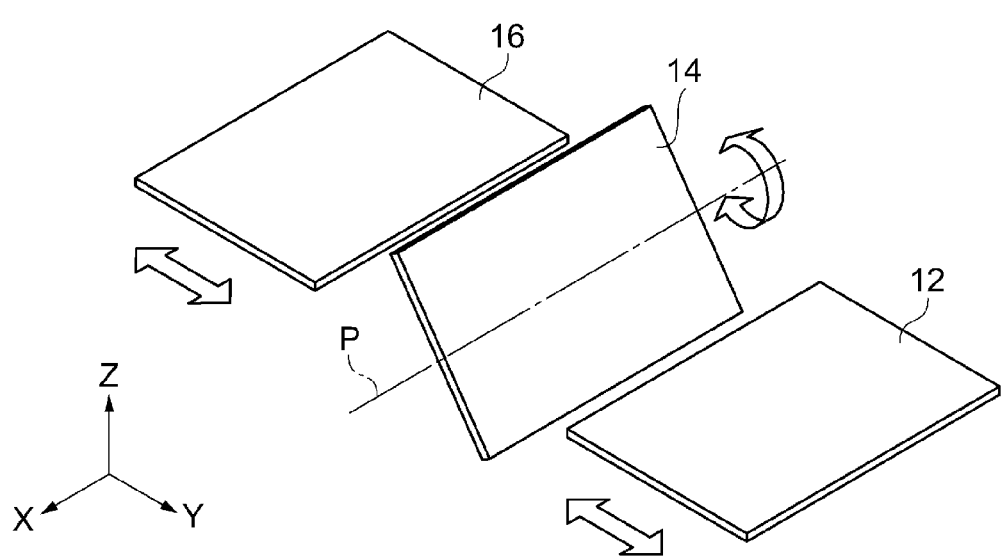

FIG. 8 is a plan view schematically showing a functional element according to the embodiment. FIGS. 9A and 9B are enlarged views (perspective views) schematically showing a portion at which a first connection portion and a second connection portion provided on the functional element are connected to each other.

Figure 10A:
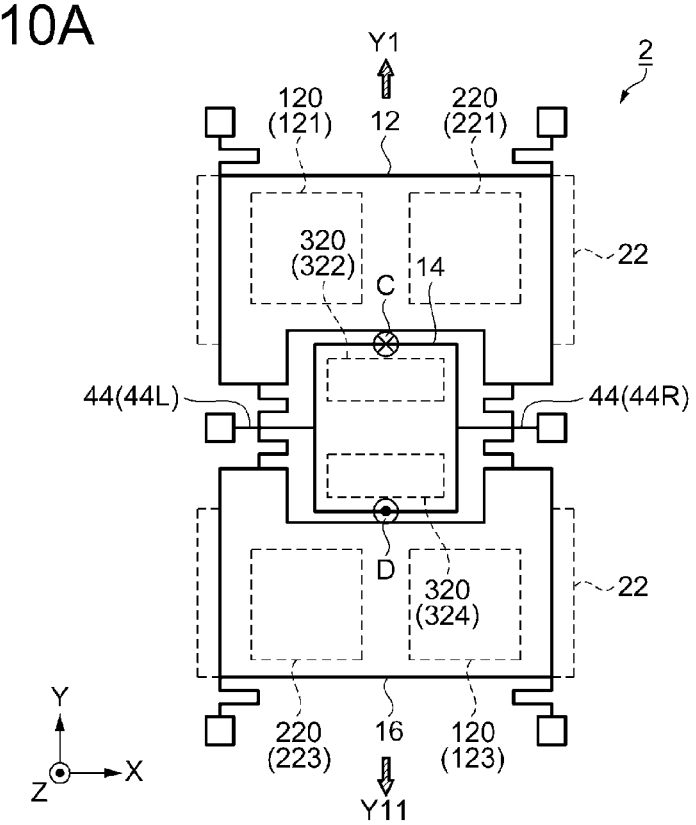
FIGS. 10A and 10B are views explaining an operation of the functional element and are plan views showing an initial state where a rotational movement is not applied to the functional element.

FIGS. 10A to 13D are views explaining the operation of the functional element according to the embodiment. FIGS. 10A and 10B are plan views showing an initial state where a rotational movement is not applied to the functional element. FIGS. 11A to 11D are plan views showing a state where a rotational movement around the Z axis is applied to the functional element. FIGS. 12A to 12D are plan views showing a state where a rotational movement around the X axis is applied to the functional element. FIGS. 13A to 13D are plan views showing a state where a rotational movement around the Y axis is applied to the functional element.

Similar to the above-described functional element 1, the functional element 2 according to the second embodiment includes the first mass portion 12, the second mass portion 14, the driving portion 22, the first connection portion 42, the second connection portion 44, the third connection portion 46, the first fixing portion 32, and the second fixing portion 36. Moreover, a third mass portion 16 is provided on the functional element 2.

In the functional element 2, the first mass portion 12 and the second mass portion 14 are connected to each other via the first connection portion 42 and the second connection portion 44. In addition, the first connection portion 42 is connected to the third mass portion 16.

In the functional element 2, the first mass portion 12, the second mass portion 14, the third mass portion 16, and the driving portion 22 are disposed in point symmetry with the second connection portion 44 as the center.

Moreover, according to vibration of the driving portion 22, vibration speed components having reverse phases can be applied to the first mass portion 12 and the third mass portion 16, and the vibration speed component can be applied to the second mass portion 14 via the first connection portion 42 and the second connection portion 44.

Hereinafter, the structure of the functional element 2 will be described in detail. Moreover, the portions similar to the functional element 1 described in the first embodiment are partially omitted, and the structure of the functional element 2 will be described.

First Mass Portion 12 and Third Mass Portion 16

The first mass portion 12 and the third mass portion 16 are masses (weights) which can be displaced by the vibration of the driving portion 22.

The first detection portion 120 and the second detection portion 220 are provided on each of the first mass portion 12 and the third mass portion 16.

Moreover, the first connection portion 42 and the third connection portion 46 are connected to each of the first mass portion 12 and the third mass portion 16.

The first connection portion 42 extended from the first mass portion 12 is extended from the first mass portion 12 toward the −Y axis direction in which the first mass portion 12 is vibrated by the vibration of the driving portion 22. Moreover, the third connection portion 46 extended from the first mass portion 12 is extended from the first mass portion 12 toward the +Y axis direction in which the first connection portion 42 is extended.

The first connection portion 42 extended from the third mass portion 16 is extended in a first direction in which the third mass portion 16 is vibrated by the vibration of the driving portion 22 and is extended from the third mass portion 16 toward the direction (hereinafter, referred to as the "+Y axis direction") in which the second mass portion 14 is provided. Moreover, the third connection portion 46 extended from the third mass portion 16 is extended from the first mass portion 12 toward the direction (hereinafter, referred to as the "−Y axis direction") opposite to the +Y axis direction in which the first connection portion 42 is extended. In addition, in descriptions below, when the first direction is referred to include the +Y axis direction and the −Y axis direction, it is referred to as the "Y axis direction".

The first detection portion 120 is provided as a sensor element which detects the "Coriolis force" by the rotational movement with a second direction (hereinafter, referred to as the "X axis direction") orthogonal to the Y axis direction as the axis. In the first detection portion 120, the detection method is not particularly limited, and various sensor elements can be used.

Similar to the functional element 1 described in the first embodiment, the first detection portion 120 of the embodiment may use a so-called "flap type" sensor element, which includes the journaled movable electrode 126 and the fixed electrode 127 disposed to face the movable electrode 126 (refer to FIG. 2A).

The second detection portion 220 is provided as a sensor element which detects the "Coriolis force" by the rotational movement with a third direction (hereinafter, referred to as the "Z axis direction") orthogonal to the X axis direction and the Y axis direction as the axis. In the second detection portion 220, the detection method is not particularly limited, and various sensor elements can be used.

Similar to the functional element 1 described in the first embodiment, as the second detection portion 220 of the embodiment, a so-called "interdigital" sensor element can be used, which includes a movable electrode 226 provided on the movable mass portion 225, and a fixed electrode 227 disposed to configure comb teeth (refer to FIG. 2B).

Second Mass Portion 14

The second mass portion 14 is a mass (weight) which can be displaced according to the displacement of the first mass portion 12 and the third mass portion 16 by the vibration speed component.

The third detection portion 320 is provided on the second mass portion 14. Moreover, the second connection portion 44 is connected to the second mass portion 14.

The second connection portion 44 extends from the second mass portion 14 toward the X axis direction (second direction) intersecting the Y axis direction (first direction) in which the first mass portion 12 and the third mass portion 16 are displaced by the vibration speed component.

In the third detection portion 320 provided on the second mass portion 14, a third detection portion 322 and a third detection portion 324 are provided in the Y axis direction (+Y axis direction and −Y axis direction) intersecting the X axis about the X axis along which the second connection portion 44 extends.

The third detection portion 322 is disposed on the second mass portion 14 of the direction (+Y axis direction) side in which the first mass portion 12 is provided from the X axis along which the second connection portion 44 extends.

The third detection portion 324 is disposed on the second mass portion 14 of a direction (−Y axis direction) side opposite to the direction in which the first mass portion 12 is provided from the X axis along which the second connection portion 44 extends.

The third detection portion 320 is provided as a sensor element which detects the "Coriolis force" by the rotational movement with the Y axis direction as the axis. In the third detection portion 320, the detection method is not particularly limited, and various sensor elements can be used.

Similar to the above-described second detection portion 220, as the third detection portion 320 of the embodiment, a so-called "interdigital" sensor element can be used, which includes a movable electrode 326 provided on the movable mass portion 325, and a fixed electrode 327 disposed to configure comb teeth (refer to FIG. 2B).

First Connection Portion 42

The first connection portion 42 extends toward the third mass portion 16 which is provided in the −Y axis direction from the first mass portion 12.

The other end of the first connection portion 42, which is different from the one end connected to the first mass portion 12, is connected to the second connection portion 44, and the first connection portion extends toward the third mass portion 16 and is connected to the third mass portion 16.

The bending portion 43 meandering in the X axis direction intersecting the Y axis direction in which the first connection portion 42 extends is provided on the first connection portion 42. The bending portion 43 is provided between the first mass portion 12 and the second connection portion 44, and between the third mass portion 16 and the second connection portion 44.

The first connection portion 42 includes the bending portion 43, and thus, can be extended and contracted in the Y axis direction.

Moreover, the first connection portion 42 includes a first connection portion 42L which is connected to the second connection portion 44L described below. In addition, the first connection portion 42 includes a first connection portion 42R which is connected to the second connection portion 44R described below.

Second Connection Portion 44 and First Fixing Portion 32

The second connection portion 44 extends from the second mass portion 14 toward the X axis direction (second direction) intersecting the Y axis direction (first direction) in which the first mass portion 12 is displaced by the vibration speed component. More specifically, the second connection portion 44 extends in both directions along the X axis about the second mass portion 14. The other end of the second connection portion 44, which is different from the one end connected to the second mass portion 14, is connected to the first fixing portion 32.

The second connection portion 44 includes the second connection portion 44R which extends in the +X axis direction from the second mass portion 14, and the second connection portion 44L which extends in the −X axis direction, which is the direction opposite to the extension direction of the second connection portion 44R, from the second mass portion 14.

The other end of the second connection portion 44R, which is different from the one end connected to the second mass portion 14, is connected to the first fixing portion 32R. The other end of the second connection portion 44L, which is different from the one end connected to the second mass portion 14, is connected to the first fixing portion 32L.

The displacement conversion mechanism E provided in the above-described connection region will be described in detail. FIG. 9A is an enlarged view which is shown from the perspective of point B in FIG. 1. The above-described first connection portion 42 is connected to the second connection portion 44. The first connection portion 42 is connected to the second connection portion 44 between the first fixing portion 32 and the second mass portion 14. Here, as shown in FIGS. 9A and 9B, the first connection portion 42 and the second connection portion 44 are connected to each other at a position deviated from the axial center P (a virtual line indicated by a reference numeral P in FIGS. 9A and 9B) of the second connection portion 44. In addition, the first connection portion 42 extending from the first mass portion 12 and the first connection portion 42 extending from the third mass portion 16 are asymmetrically connected to each other at the position deviated from the axial center P of the second connection portion 44.

Accordingly, when the first mass portion 12 and the third mass portion 16 linearly move, the force, which is applied to the first connection portion 42 according to the linear displacement, is transmitted to the second connection portion 44. At this time, since the point of application of the force is deviated from the axial center P, the linear movement of the first connection portion 42 is converted into the rotational moment of the second connection portion 44.

Accordingly, the second connection portion 44 can rotate with the axial center P as the rotational axis. Moreover, the second mass portion 14 connected to the second connection portion 44 can rotate with the X axis along which the second connection portion 44 extends as the rotational axis. On the contrary, when the second mass portion 14 is rotated, a torsional force which is applied to the first connection portion 42 according to the displacement of the rotation is transmitted to the first connection portion 42. At this time, the rotational moment of the second connection portion 44 is converted into the linear movement of the first connection portion 42.

The relationship between the linear movement and the rotational movement described above is shown in FIG. 9B. The first mass portion 12 and the third mass portion 16 linearly move in the Y axis direction, and the second mass portion 14 rotates about the axial center P. By the displacement conversion mechanism E which is provided on the connection region, the linear movements of the first mass portion 12 and the third mass portion 16 and the rotational movement of the second mass portion 14 can be in complementarily conjunction with each other.

Moreover, the forces, which are applied to the first connection portion 42 extending from the first mass portion 12 and the first connection portion 42 extending from the third mass portion 16, and are displaced in the Y axis direction, are applied in the reverse phase.

Third Connection Portion 46 and Second Fixing Portion 36

Return to FIG. 8, the third connection portion 46 and the second fixing portion 36 will be described.

The third connection portion 46 extends from the first mass portion 12 and the third mass portion 16.

The third connection portion 46 extending from the first mass portion 12 extends toward the +Y axis direction opposite to the direction in which the first connection portion 42 extends from the first mass portion 12, and the other end of the third connection portion different from the one end connected to the first mass portion 12 is connected to the second fixing portion 36. The third connection portion 46 extending from the third mass portion 16 extends toward the −Y axis direction opposite to the direction in which the first connection portion 42 extends from the third mass portion 16, and the other end of the third connection portion different from the one end connected to the first mass portion 12 is connected to the second fixing portion 36. Moreover, the third connection portion 46 includes a third connection portion 46L connected to the second fixing portion 36L and a third connection portion 46R connected to the second fixing portion 35R.

Similar to the first connection portion 42, the bending portion 43 meandering in the X axis direction intersecting the Y axis direction in which the third connection portion 46 extends is provided on the third connection portion 46. The bending portion 43 is provided between the first mass portion 12 and the second fixing portion 36. Since the third connection portion 46 includes the bending portion 43, the third connection portion 46 can be extended and contracted in the Y axis direction.

Driving Portion 22

The driving portion 22 vibrates the first mass portion 12 and the third mass portion 16, and is provided to apply the vibration speed component in the Y axis direction, which is the first direction, to the first mass portion 12 and the third mass portion 16.

The vibration of the driving portion 22 vibrates the first mass portion 12 and the third mass portion 16 in the reverse phase. Accordingly, the vibration speed displacement having the reverse phase can be applied to the first mass portion 12 and the third mass portion 16. The method in which the driving portion 22 vibrates the first mass portion 12 and the third mass portion 16 is not particularly limited, and various piezoelectric drive elements or electrostatic drive elements can be used. As an example, the driving portion 22 of the embodiment uses the electrostatic drive element. Since the electrostatic drive element is used, by electrostatic induction generated between an electrode (not shown) provided on the driving portion 22 and electrodes (not shown) provided on the first mass portion 12 and the third mass portion 16, the first mass portion 12 and the third mass portion 16 are vibrated, and the vibration speed components in the Y axis direction can be applied to the first mass portion and the third mass portion.

Operation of Functional Element 2

An operation of the functional element 2 will be described with reference to FIGS. 10A to 13D.

The vibration speed component associated with the linear movement having the reverse phase along the Y axis direction is applied to the first mass portion 12 and the third mass portion 16 by the vibration of the driving portion 22. That is, when the first mass portion 12 is displaced in the +Y axis direction, the third mass portion 16 is displaced in the −Y axis direction which is the reverse phase. Moreover, when the first mass portion 12 is displaced in the −Y axis direction, the third mass portion 16 is displaced in the +Y axis direction which is the reverse phase.

When the first mass portion 12 is displaced in the +Y axis direction (the direction of the arrow Y1 in FIG. 10A) and the third mass portion 16 is displaced in the −Y axis direction (a direction of an arrow Y11 in FIG. 10A) by the vibration speed component, the second mass portion 14 is rotated with the X axis, to which the second connection portion 44 extends, as the rotational axis. In the second mass portion 14, the side on which the third detection portion 322 is provided is rotated in the −Z axis direction (the rear side of the paper surface which is the direction of the arrow C in FIG. 10A), and on the other hand, the side on which the third detection portion 324 is provided is rotated in the +Z axis direction (the front side of the paper surface which is the direction of the arrow D in FIG. 10A). Moreover, in the following descriptions with respect to the operation of the functional element 2, this displacement is referred to as "first vibration speed displacement" by the vibration.

When the first mass portion 12 is displaced in the −Y axis direction (the direction of the arrow Y2 in FIG. 10B) and the third mass portion 16 is displaced in the +Y axis direction (a direction of an arrow Y21 in FIG. 10B) by the vibration speed component, the second mass portion 14 is rotated with the X axis, to which the second connection portion 44 extends, as the rotational axis. In the second mass portion 14, the side on which the third detection portion 322 is provided is rotated in the +Z axis direction (the front side of the paper surface which is the direction of the arrow D in FIG. 10B), and on the other hand, the side on which the third detection portion 324 is provided is rotated in the −Z axis direction (the rear side of the paper surface which is the direction of the arrow C in FIG. 10B). Moreover, in the following descriptions with respect to the operation of the functional element 2, this displacement is referred to as "second vibration speed displacement" by the vibration.

In addition, when the first vibration speed displacement and the second vibration speed displacement are collectively referred to be included, it is referred to as "vibration speed displacement", and the direction in which the displacement is generated is referred to as the "vibration speed displacement direction".

Figure 10B:
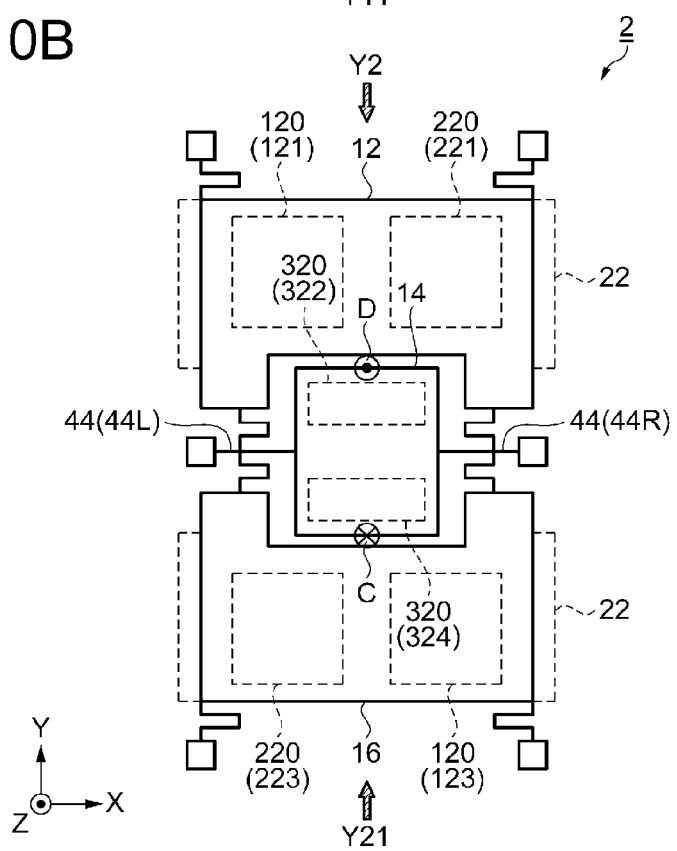

In the functional element 2, as shown in FIGS. 10A and 10B, when the rotational movement or the like is not applied to the functional element 2, in all the first detection portion 120, the second detection portion 220, and the third detection portion 320, the displacement in the gaps between the fixed electrodes 127, 227, and 327 and the movable electrodes 126, 226, and 326 is not generated.

Moreover, in the functional element 2, the vibration speed component in the direction different from the direction of the vibration speed component applied to the first mass portion 12 and the third mass portion 16 can be applied to the second mass portion 14.

Operation when Rotation Movement with Z Axis as the Rotational Axis is Applied

As shown in FIGS. 11A to 11D, in the functional element 2, when the rotational movement with the Z axis as the rotational axis is applied, among the first detection portion 120, the second detection portion 220, and the third detection portion 320, the displacement is generated in the gap between the fixed electrode 227 and the movable electrode 226 included in the second detection portion 220 (the illustration is omitted in FIGS. 11A to 11D, and thus, refer to FIGS. 2A and 2B). Specifically, if the rotational movement with the Z axis as the rotational axis is applied when the vibration speed displacement is generated in the first mass portion 12 and the third mass portion 16, the Coriolis displacement is generated in the direction (X axis direction) orthogonal to the vibration speed displacement direction (Y axis direction).

When the vibration speed displacement is generated in the first mass portion 12 the third mass portion 16 as shown in FIGS. 11A and 11B, if a counterclockwise rotational movement with the Z axis as the rotational axis is applied, the force by the Coriolis displacement is generated in the second detection portion 221 and the second detection portion 223.

According to the force by the Coriolis displacement, the movable electrode 226 (movable mass portion 225) included in the second detection portion 221 and the second detection portion 223 is displaced in the X axis direction. In the second detection portion 221 and the second detection portion 223, since the movable electrode 226 is displaced in the X axis direction, the gap between the fixed electrode 227 and the movable electrode 226 is changed, and thus, the rotational movement can be detected.

As shown in FIG. 11A, when the first vibration speed displacement is generated in the first mass portion 12 and the third mass portion 16, the movable electrode 226 included in the second detection portion 221 is displaced in the +X axis direction (the direction of the arrow A in FIG. 11A). In addition, the movable electrode 226 included in the second detection portion 223 is displaced in the −X axis direction (the direction of the arrow B in FIG. 11A).

As shown FIG. 11B, when the second vibration speed displacement is generated in the first mass portion 12 and the third mass portion 16, the movable electrode 226 included in the second detection portion 221 is displaced in the −X axis direction (the direction of the arrowB in FIG. 11B). Moreover, the movable electrode 226 included in the second detection portion 223 is displaced in the +X axis direction (the direction of the arrow A in FIG. 11B).

By this displacement, the counterclockwise rotational movement with the Z axis as the rotational axis can be detected.

When the vibration speed displacement is generated in the first mass portion 12 and the third mass portion 16 as shown in FIGS. 11C and 11D, if the clockwise rotational movement with the Z axis as the rotational axis is applied, the force by the Coriolis displacement is generated in the second detection portion 221. According to the force by the Coriolis displacement, the movable electrode 226 (movable mass portion 225) included in the second detection portion 221 and the second detection portion 223 is displaced in the X axis direction. In the second detection portion 221 and the second detection portion 223, since the movable electrode 226 is displaced in the X axis direction, the gap between the fixed electrode 227 and the movable electrode 226 is changed, and thus, the rotational movement can be detected.

As shown in FIG. 11C, when the first vibration speed displacement is generated in the first mass portion 12 and the third mass portion 16, the movable electrode 226 included in the second detection portion 221 is displaced in the −X axis direction (the direction of the arrow B in FIG. 11C). In addition, the movable electrode 226 included in the second detection portion 223 is displaced in the +X axis direction (the direction of the arrow A in FIG. 11C).

As shown FIG. 11D, when the second vibration speed displacement is generated in the first mass portion 12 and the third mass portion 16, the movable electrode 226 included in the second detection portion 221 is displaced in the +X axis direction (the direction of the arrow A in FIG. 11D). Moreover, the movable electrode 226 included in the second detection portion 223 is displaced in the −X axis direction (the direction of the arrow B in FIG. 11D).

By this displacement, the clockwise rotational movement with the Z axis as the rotational axis can be detected.

In addition, the rotational movement with the Z axis as the rotational axis is detected by differential motion which uses the second detection portion 221 provided on the first mass portion 12 and the second detection portion 223 provided on the third mass portion 16 being displaced in the reverse phase, and thus, the detection accuracy can be increased.

Operation when Rotation Movement with Y Axis as the Rotational Axis is Applied

As shown in FIGS. 12A to 12D, in the functional element 2, when the rotational movement with the Y axis as the rotational axis is applied, among the first detection portion 120, the second detection portion 220, and the third detection portion 320, the displacement is generated in the gap between the fixed electrode 327 and the movable electrode 326 included in the third detection portion 320 (the illustration is omitted in FIGS. 12A to 12D, and thus, refer to FIGS. 2A and 2B). Specifically, if the rotational movement with the Y axis as the rotational axis is applied when the vibration speed displacement is generated in the second mass portion 14, the Coriolis displacement is generated in the direction (X axis direction) orthogonal to the vibration speed displacement direction (Y axis direction).

When the vibration speed displacement is generated in the second mass portion 14 as shown in FIGS. 12A and 12B, if a counterclockwise rotational movement with the Y axis as the rotational axis is applied, the force by the Coriolis displacement is generated in the third detection portion 320.

According to the force by the Coriolis displacement, the movable electrode 326 (movable mass portion 325) included in the third detection portion 320 is displaced in the X axis direction. In the third detection portion 320, since the movable electrode 326 is displaced in the X axis direction, the gap between the fixed electrode 327 and the movable electrode 326 is changed, and thus, the rotational movement can be detected.

As shown in FIG. 12A, when the first vibration speed displacement is generated in the second mass portion 14, the movable electrode 326 included in the third detection portion 322 is displaced in the +X axis direction (the direction of the arrow A in FIG. 12A). In addition, the movable electrode 326 included in the third detection portion 324 is displaced in the −X axis direction (the direction of the arrow B in FIG. 12A).

As shown in FIG. 12B, when the second vibration speed displacement is generated in the second mass portion 14, the movable electrode 326 included in the third detection portion 322 is displaced in the −X axis direction (the direction of the arrow B in FIG. 12B). Moreover, the movable electrode included in the third detection portion 324 is displaced in the +X axis direction (the direction of the arrow A in FIG. 12B).

Here, the direction (Z axis direction) of the vibration speed displacement applied to the second mass portion 14, on which the third detection portion 322 and the third detection portion 324 are provided, is the reverse phase (reverse direction) to each other, and thus, the force by the Coriolis displacement is also generated in the reverse direction.

By this displacement, the counterclockwise rotational movement with the Y axis as the rotational axis can be detected.

When the vibration speed displacement is generated in the second mass portion 14 as shown in FIGS. 12C and 12D, if a clockwise rotational movement with the Y axis as the rotational axis is applied, the force by the Coriolis displacement is generated in the third detection portion 320.

According to the force by the Coriolis displacement, the movable electrode 326 (movable mass portion 325) included in the third detection portion 320 is displaced in the X axis direction. In the third detection portion 320, since the movable electrode 326 is displaced in the X axis direction, the gap between the fixed electrode 327 and the movable electrode 326 is changed, and thus, the rotational movement can be detected.

As shown in FIG. 12C, when the first vibration speed displacement is generated in the second mass portion 14, the movable electrode 326 included in the third detection portion 322 is displaced in the −X axis direction (the direction of the arrow B in FIG. 12C). In addition, the movable electrode 326 included in the third detection portion 324 is displaced in the +X axis direction (the direction of the arrow A in FIG. 12C).

As shown FIG. 12D, when the second vibration speed displacement is generated in the second mass portion 14, the movable electrode 326 included in the third detection portion 322 is displaced in the +X axis direction (the direction of the arrow A in FIG. 12D). Moreover, the movable electrode included in the third detection portion 324 is displaced in the −X axis direction (the direction of the arrow B in FIG. 12D).

Here, the direction (Z axis direction) of the vibration speed displacement applied to the second mass portion 14, on which the third detection portion 322 and the third detection portion 324 are provided, is a reverse direction, and thus, the force by the Coriolis displacement is also generated in the reverse direction.

By this displacement, the clockwise rotational movement with the Y axis as the rotational axis can be detected.

In addition, in the second mass portion 14, the third detection portion 322 and the third detection portion 324 are provided about the extension line of the second connection portion 44, the rotational movement with the Y axis as the rotational axis is detected by differential motion which uses the third detection portion 322 and the third detection portion 324 being displaced in the reverse phase, and thus, the detection accuracy can be increased.

Operation when Rotation Movement with X Axis as the Rotational Axis is Applied

As shown in FIGS. 13A to 13D, in the functional element 2, when the rotational movement with the X axis as the rotational axis is applied, among the first detection portion 120, the second detection portion 220, and the third detection portion 320, the displacement is generated in the gap between the fixed electrode 127 and the movable electrode 126 included in the first detection portion 120 (the illustration is omitted in FIGS. 13A to 13D, and thus, refer to FIGS. 2A and 2B). Specifically, if the rotational movement with the X axis as the rotational axis is applied when the vibration speed displacement is generated in the first mass portion 12 and the third mass portion 16, the Coriolis displacement is generated in the direction (Z axis direction) orthogonal to the vibration speed displacement direction (Y axis direction).

When the vibration speed displacement is generated in the first mass portion 12 and the third mass portion 16 as shown in FIGS. 13A and 13B, if a counterclockwise rotational movement with the Y axis as the rotational axis is applied, the force by the Coriolis displacement is generated in the first detection portion 121 and the first detection portion 123.

According to the force by the Coriolis displacement, the movable electrode 126 included in the first detection portion 121 and the first detection portion 123 is displaced in the Z axis direction. In the first detection portion 120, since the movable electrode 126 is displaced in the Z axis direction, the gap between the fixed electrode 127 and the movable electrode 126 is changed, and thus, the rotational movement can be detected.

As shown in FIG. 13A, when the first vibration speed displacement is generated in the first mass portion 12 and the third mass portion 16, the movable electrode 126 included in the first detection portion 121 is displaced in the −Z axis direction (the direction of the arrow C in FIGS. 13A to 13D). Moreover, the movable electrode included in the first detection portion 123 is displaced in the +Z axis direction (the direction of the arrow D in FIGS. 13A to 13D).

As shown FIG. 13B, when the second vibration speed displacement is generated in the first mass portion 12 and the third mass portion 16, the movable electrode 126 included in the first detection portion 121 is displaced in the +Z axis direction (the direction of the arrow D in FIG. 13A to 13D). In addition, the movable electrode 126 included in the first detection portion 123 is displaced in the −Z axis direction (the direction of the arrow C in FIG. 13A to 13D).

By this displacement, the counterclockwise rotational movement with the X axis as the rotational axis can be detected.

When the vibration speed displacement is generated in the first mass portion 12 and the third mass portion 16 as shown in FIGS. 13C and 13D, if a clockwise rotational movement with the Y axis as the rotational axis is applied, the force by the Coriolis displacement is generated in the first detection portion 121 and the first detection portion 123.

According to the force by the Coriolis displacement, the movable electrode 126 included in the first detection portion 121 and the first detection portion 123 is displaced in the Z axis direction. In the first detection portion 121 and the first detection portion 123, since the movable electrode 126 is displaced in the Z axis direction, the gap between the fixed electrode 127 and the movable electrode 126 is changed, and thus, the rotational movement can be detected.

As shown in FIG. 13C, when the first vibration speed displacement is generated in the first mass portion 12 and the third mass portion 16, the movable electrode 126 included in the first detection portion 120 is displaced in the +Z axis direction (the direction of the arrow D in FIGS. 13A to 13D).

As shown FIG. 13B, when the second vibration speed displacement is generated in the first mass portion 12 and the third mass portion 16, the movable electrode included in the first detection portion 120 is displaced in the −Z axis direction (the direction of the arrow C in FIGS. 13A to 13D).

By this displacement, the clockwise rotational movement with the X axis as the rotational axis can be detected.

In addition, the rotational movement with the X axis as the rotational axis is detected by differential motion which uses the first detection portion 121 provided on the first mass portion 12 and the first detection portion 123 provided on the third mass portion 16 being displaced in the reverse phase, and thus, the detection accuracy can be increased.

According to the above-described second embodiment, the following effects can be obtained.

According to the functional element 2, the first detection portion 120 can detect the rotational movement with the X axis as the axis by the differential motion, and the second detection portion 220 can detect the rotational movement with the Z axis as the axis by the differential motion. Moreover, the third detection portion 320 can detect the rotational movement with the Y axis as the axis. Therefore, the functional element 2 can be realized, which can detect the rotational movements in the three axes in which the directions in the vibration speed components applied to the first mass portion 12 and the second mass portion 14 are different from one another while suppressing the disposition areas of the first mass portion 12 and the second mass portion 14. Moreover, since the disposition areas of the first mass portion 12 and the second mass portion 14 are suppressed, the functional element 2 capable of achieving a reduction in size and detecting the rotational movements of three axes can be realized. Moreover, in the functional element 2, the rotational movements with the X axis and the Z axis as the axes are differentially detected by the first detection portion 120 and the third detection portion 320 provided on the first mass portion 12 and the third mass portion 16, and thus, the detection accuracy can be increased.

Moreover, the functional element 1 and the functional element 2 are configured to include two or three mass portions in which the vibration speed displacement can be performed in the Y axis direction or the Z axis direction, and the number of the mass portions is smaller than that of the functional element of the related art. In addition, the degrees of freedom of the first connection portion 42 and the second connection portion 44 which are elastic connection mechanisms are limited to the Y axis and the X axis. Accordingly, in the functional element 1 and the functional element 2, unnecessary resonance frequency is suppressed. Therefore, the accuracy of the detection in the rotational movements with the X axis and the Z axis as the axes can be increased.

Example

Examples to which the functional element 1 and the functional element 2 according to the embodiments of the invention are applied will be described with reference to FIGS. 14 to 17. Moreover, in descriptions below, the functional element 1 and the functional element 2 are collectively referred to as the functional element 1.

Electronic Device

An electronic device to which the functional element 1 according to the embodiment of the invention is applied will be described with reference to FIGS. 14 to 16.

Figure 14:
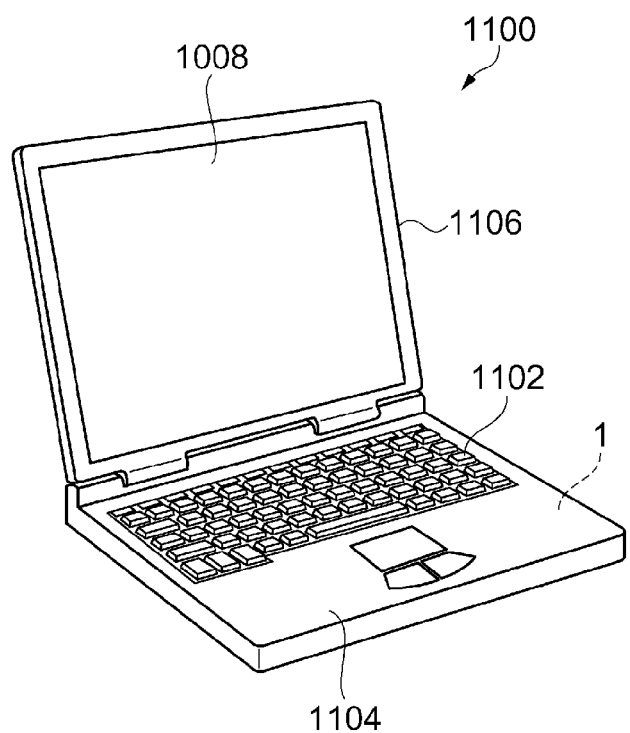
FIG. 14 is a view schematically showing a personal computer which is an electronic device according to an example.

FIG. 14 is a perspective view showing an outline of a configuration of a laptop type (or mobile type) personal computer which is the electronic device including the functional element 1 according to the embodiments of the invention. In FIG. 14, a laptop type personal computer 1100 is configured of a main body portion 1104 having a keyboard 1102 and a display unit 1106 having a display portion 1008, and the display unit 1106 is rotatably supported to the main body portion 1104 via a hinge structure portion. In the laptop type personal computer 1100, the functional element 1 which measures a physical quantity such as acceleration or an angular velocity for measuring the dropping or the inclination is mounted. In the functional element 1, the mass portions for obtaining vibration speed components having directions different from each other are provided, the areas in which the mass portions are disposed are suppressed, and the detection accuracy is increased. Accordingly, the above-described functional element 1 is mounted, and thus, the laptop type personal computer 1100 in which reliability is high and the size is reduced can be obtained.

Figure 15:
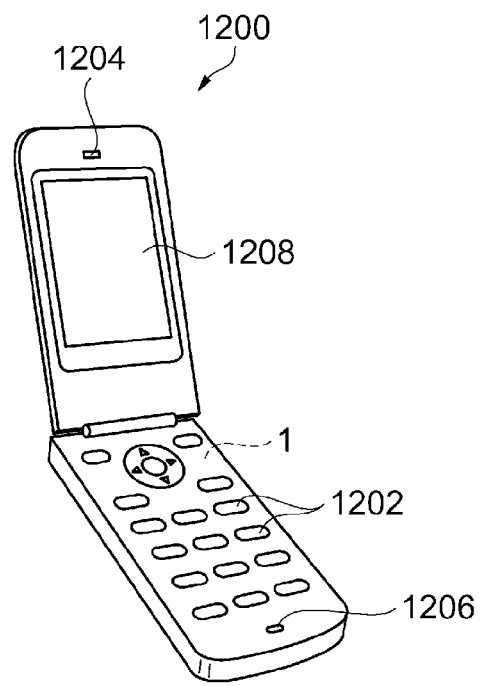
FIG. 15 is a view schematically showing a cellular phone which is an electronic device according to an example.

FIG. 15 is a perspective view showing an outline of a configuration of a cellular phone (also includes PHS) which is the electronic device including the functional element 1 of the embodiments of the invention. In FIG. 15, a cellular phone 1200 includes a plurality of operation buttons 1202, an ear piece 1204, and a mouth piece 1206, and a display portion 1208 is disposed between the operation buttons 1202 and the ear piece 1204. In the cellular phone 1200, the functional element 1 which measures a physical quantity such as acceleration or an angular velocity for measuring the dropping or the inclination is mounted. In the functional element 1, the mass portions for obtaining vibration speed components having directions different from each other are provided, the areas in which the mass portions are disposed are suppressed, and the detection accuracy is increased. Accordingly, the above-described functional element 1 is mounted, and thus, the cellular phone 1200 in which reliability is high and the size is reduced can be obtained.

Figure 16:
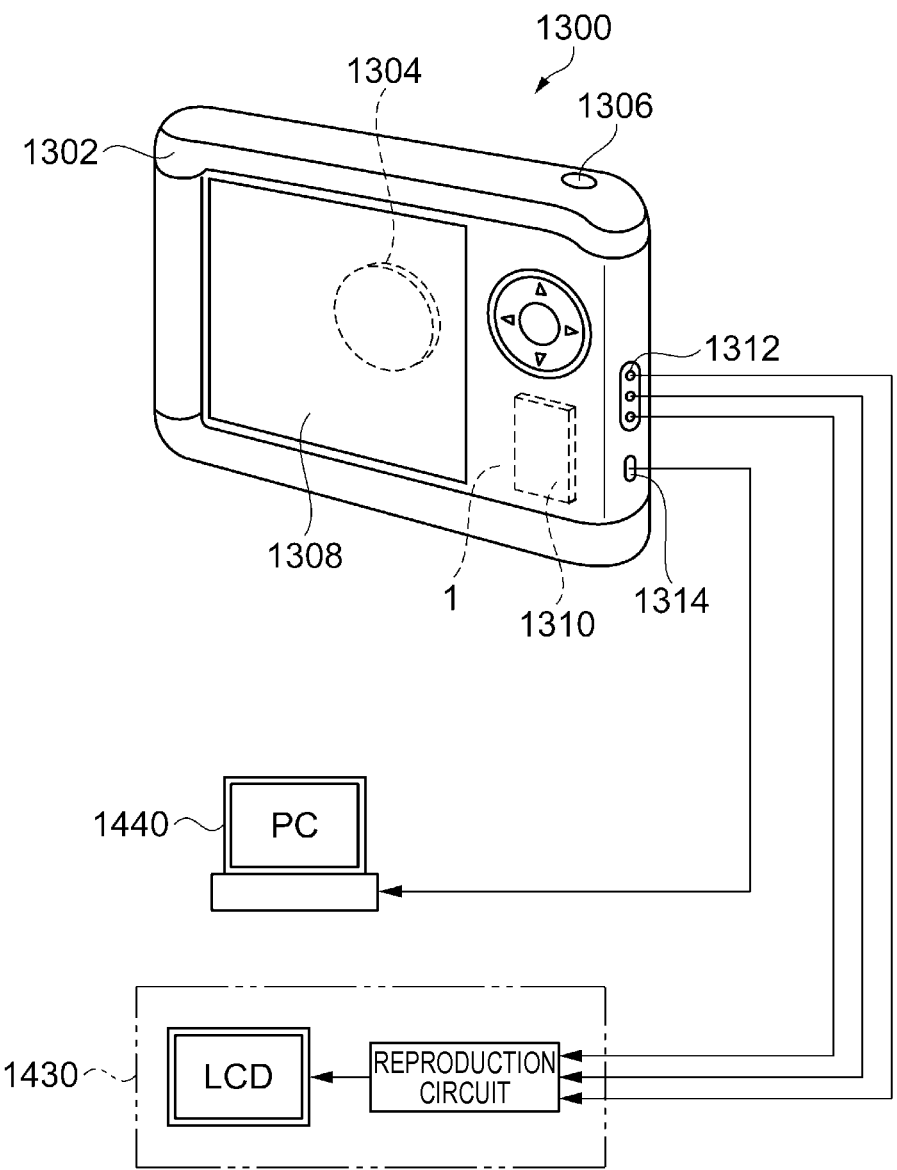
FIG. 16 is a view schematically showing a digital still camera which is an electronic device according to an example.

FIG. 16 is a perspective view showing an outline of a configuration of a digital still camera which is the electronic device including the functional element 1 according to embodiments of the invention. Moreover, in FIG. 16, the connection to the external device is shown simply. Here, in a general camera, a silver salt photographic film is exposed by a light image of a subject. On the other hand, in a digital still camera 1300, the light image of the subject is photoelectrically converted by an imaging device such as a Charge Coupled Device (CCD), and imaging signals (image signals) are generated.

A display portion 1308 is provided on the rear surface of a case (body) 1302 in a digital still camera 1300 and is configured to perform the display based on imaging signals of the CCD, and the display portion 1308 functions as a finder which displays the subject as an electronic image. Moreover, a light receiving unit 1304 including an optical lens (an imaging optical system), the CCD, or the like is provided on the front surface side (the rear surface side in the drawing) of the case 1302.

If a photographer confirms a subject image displayed on the display portion 1308 and presses a shutter button 1306, the imaging signals of the CCD at the point in time are transmitted to and stored in a memory 1310. Moreover, in the digital still camera 1300, a video signal output terminal 1312, and an input and output terminal for data communication 1314 are provided on the side surface of the case 1302. In addition, as shown in FIG. 16, a liquid crystal display 1430 is connected to the video signal output terminal 1312 and a personal computer (PC) 1440 is connected to the input and output terminal for data communication 1314, if necessary. Moreover, the imaging signals stored in the memory 1310 are output to the liquid crystal display 1430 or the personal computer 1440 according to a predetermined operation. In the digital still camera 1300, the functional element 1 which measures a physical quantity such as an acceleration or angular velocity for measuring the dropping or the inclination is mounted. In the functional element 1, the mass portions for obtaining vibration speed components having directions different from each other are provided, the areas in which the mass portions are disposed are suppressed, and the detection accuracy is increased. Accordingly, the above-described functional element 1 is mounted, and thus, the digital still camera 1300 in which reliability is high and the size is reduced can be obtained.

In addition, for example, the functional element 1 according to the embodiments of the invention may be applied to an electronic device such as an ink jet type ejecting apparatus (for example, an ink jet printer), a television, a video camera, a video tape recorder, a car navigation apparatus, a pager, an electronic organizer (with a communication function), an electronic dictionary, an electronic calculator, electronic game equipment, a word processor, a work station, a video telephone, a television monitor for crime prevention, an electronic binocular, a POS terminal, medical equipment (for example, electronic thermometer, sphygmomanometer, blood sugar meter, electrocardiogram measurement device, ultrasonic diagnostic equipment, or electronic endoscope), a fish finder, various measurement devices, instruments (for example, instruments for vehicle, airplane, or ship), or a flight simulator, in addition to the laptop type personal computer (mobile type personal computer) shown in FIG. 14, the cellular phone shown in FIG. 15, and the digital still camera shown in FIG. 16.

Moving Object

Figure 17:
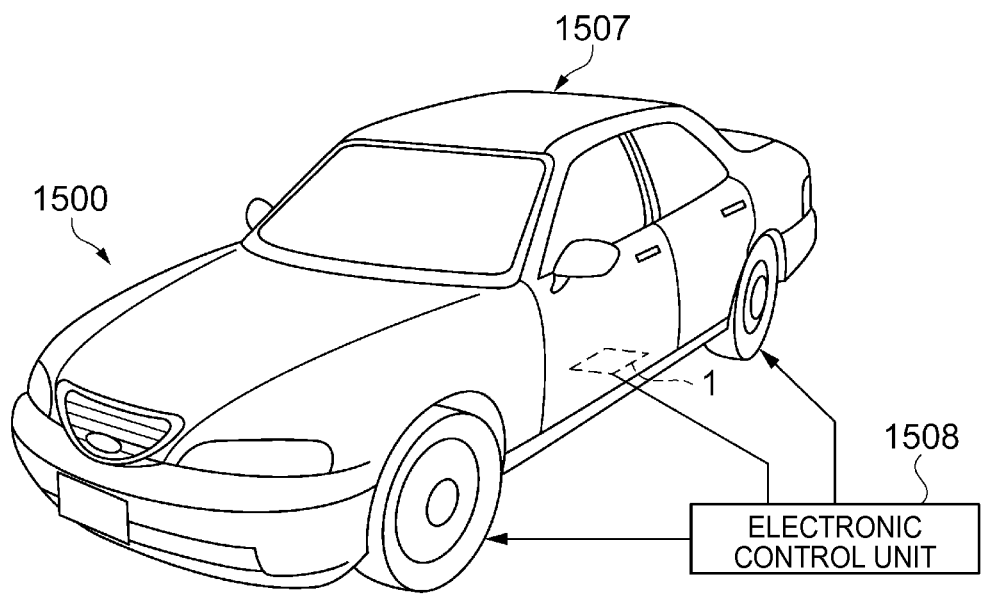
FIG. 17 is a view schematically showing an automobile which is a moving object according to an example.

FIG. 17 is a perspective view schematically showing an automobile which is an example of a moving object. Various control units having a sensor device 100 which processes various control signals are mounted on the automobile 1500. For example, as shown in FIG. 17, in the automobile 1500 which is the moving object, an Electronic Control Unit (ECU) 1508 which includes a sensor detecting the acceleration of the automobile 1500 and controls an output of an engine is mounted on a vehicle body 1507. The functional element 1 which measures the physical quantity such as the acceleration or angular velocity of the vehicle body 1507 is mounted on the Electronic Control Unit 1508. In the functional element 1, the mass portions for obtaining vibration speed components having directions different from each other are provided, the areas in which the mass portions are disposed are suppressed, and the detection accuracy is increased. Accordingly, the engine output control is performed with high accuracy according to the posture of the vehicle body 1507, consumption of the fuel or the like is suppressed, and thus, the automobile 1500 which is an effective moving object can be obtained.

In addition, the functional element 1 can be widely applied to a vehicle body posture control unit, an Antilock Brake System (ABS), an air bag, or a Tire Pressure Monitoring System (TPMS).

What is claimed is:

1. A functional element comprising:
   a driving portion;
   a first mass portion which is movable in a first direction and is driven by the driving portion;
   a first connection portion which is connected to the first mass portion at a first end and is extendable and contractible in the first direction along the length of the first connection portion;
   a second connection portion which is connected to a second end of the first connection portion and is formed in a second direction intersecting the first direction, the length of the second connection portion extending in the second direction; and
   a second mass portion which is connected to an end of the second connection portion,
   wherein the second mass portion can rotate with an axial center of the second connection portion as a rotational axis.

2. The functional element according to claim 1,
   wherein the first connection portion is asymmetrically connected to the second connection portion with respect to the axial center of the second connection portion.

3. The functional element according to claim 1,
   wherein the second mass portion includes a detection portion which detects a Coriolis force by at least one of a rotational movement having an axial center in the first direction and a rotational movement having an axial center in the second direction.

4. The functional element according to claim 1,
   wherein the first mass portion includes a detection portion which detects a Coriolis force by a rotational movement having an axial center in a direction orthogonal to the first direction.

5. The functional element according to claim 1,
   wherein the first connection portion is connected to a third mass portion opposite to the first mass portion.

6. The functional element according to claim 5,
   wherein the third mass portion includes a detection portion which detects a Coriolis force by a rotational movement having an axial center in a direction orthogonal to the first direction.

7. An electronic device on which the functional element according to claim 1 is mounted.

8. An electronic device on which the functional element according to claim 2 is mounted.

9. An electronic device on which the functional element according to claim 3 is mounted.

10. An electronic device on which the functional element according to claim 4 is mounted.

11. An electronic device on which the functional element according to claim 5 is mounted.

12. An electronic device on which the functional element according to claim 6 is mounted.

13. A moving object on which the functional element according to claim 1 is mounted.

14. A moving object on which the functional element according to claim 2 is mounted.

15. A moving object on which the functional element according to claim 3 is mounted.

16. A moving object on which the functional element according to claim 4 is mounted.

17. A moving object on which the functional element according to claim 5 is mounted.

18. A moving object on which the functional element according to claim 6 is mounted.

* * * * *